(12) United States Patent
Yoshida et al.

(10) Patent No.: US 11,595,191 B2
(45) Date of Patent: Feb. 28, 2023

(54) ENCRYPTION KEY MANAGEMENT SYSTEM AND ENCRYPTION KEY MANAGEMENT METHOD

(71) Applicant: Hitachi, Ltd., Tokyo (JP)

(72) Inventors: Yutaka Yoshida, Tokyo (JP); Mioko Moriguchi, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 225 days.

(21) Appl. No.: 17/179,920

(22) Filed: Feb. 19, 2021

(65) Prior Publication Data

US 2022/0069983 A1 Mar. 3, 2022

(30) Foreign Application Priority Data

Aug. 31, 2020 (JP) .............................. JP2020-145933

(51) Int. Cl.
*H04L 9/08* (2006.01)
*H04L 9/32* (2006.01)

(52) U.S. Cl.
CPC ............ *H04L 9/0822* (2013.01); *H04L 9/083* (2013.01); *H04L 9/0891* (2013.01); *H04L 9/0894* (2013.01); *H04L 9/3236* (2013.01)

(58) Field of Classification Search
CPC ......... H04L 9/08; H04L 9/0822; H04L 9/083; H04L 9/0891; H04L 9/0894; H04L 9/32; H04L 9/3236; H04L 63/06; H04L 63/062
See application file for complete search history.

(56) References Cited

U.S. PATENT DOCUMENTS

| 8,010,810 B1 | 8/2011 | Fitzgerald et al. | |
|---|---|---|---|
| 2012/0300940 A1* | 11/2012 | Sabin | H04L 63/06 380/282 |
| 2016/0117263 A1* | 4/2016 | Kanno | H04L 63/061 713/171 |
| 2019/0073281 A1* | 3/2019 | Wicaksono | G06F 16/2365 |
| 2021/0176049 A1* | 6/2021 | Kwak | G06F 21/602 |
| 2022/0121627 A1* | 4/2022 | Inbar | G06F 16/27 |
| 2022/0245103 A1* | 8/2022 | Elder | G06F 16/1873 |

FOREIGN PATENT DOCUMENTS

WO 2015/004706 A1 1/2015

* cited by examiner

*Primary Examiner* — Shaqueal D Wade-Wright
(74) *Attorney, Agent, or Firm* — Procopio, Cory, Hargreaves & Savitch LLP

(57) ABSTRACT

A storage apparatus sends a request for a key encryption key to a key management server using a storage apparatus ID as a parameter, acquires the key encryption key, for which a request has been sent to the key management server, and its attribute information, and stores the key encryption key and its attribute information in a key encryption key list while eliminating the key encryption key that is duplicated. Then, in the order listed in the key encryption key list, decryption of the encryption key is attempted by the key encryption key stored in the key encryption key list, and the success or failure of the decryption of the encryption key is determined. When the decryption of the encryption key using the key encryption key fails, the decryption of the encryption key is attempted using a key encryption key, which has not been attempted yet, in the key encryption key list.

7 Claims, 21 Drawing Sheets

FIG. 3

KEY MANAGEMENT SERVER INFORMATION TABLE 201

| | SETTING ITEM | MEANING | EXAMPLE OF VALUE |
|---|---|---|---|
| 201a | KEY MANAGEMENT SERVER NUMBER | NUMBER OF KEY MANAGEMENT SERVER | 1 |
| 201b | CLUSTER | NUMBER OF KMS CLUSTER PRIMARY/SECONDARY | Primary-1/Secondary-1 |
| 201c | KEY ENCRYPTION GENARATION | SETTING REGARDING WHETHER OR NOT SERVER GENERATES KEY ENCRYPTION KEY | VALID/INVALID |
| 201d | HOST NAME/IP ADDRESS | HOST NAME OR IP ADDRESS OF KMS | 10.197.181.111 |
| 201e | PORT NUMBER | CONNECTION DESTINATION PORT NUMBER OF KMS | 5696 |
| 201f | NUMBER OF RETRIES | NUMBER OF RETRIES WHEN COMMUNICATION WITH KMS FAILS | THREE TIMES |
| 201g | RETRY INTERVAL | RETRY INTERVAL WHEN COMMUNICATION WITH KMS FAILS | ONE SECOND |
| 201h | CONNECTION TIMEOUT TIME | WAITING TIME WHEN MAKING CONNECTION WITH KMS | 60 SECONDS |
| 201i | MAXIMUM DATA LENGTH OF SecretData | MAXIMUM DATA LENGTH (byte) OF SecretData SUPPORTED BY KMS | 4096 |
| 201j | CLIENT CERTIFICATE AND SECRET KEY | PKCS #7 CLIENT CERTIFICATE AND FILED PKCS #12 FILE OF PKCS #8 SECRET KEY THAT ARE USED FOR MUTUAL AUTHENTICATION FOR ESTABLISHING TLS (Transport Layer Security) COMMUNICATION WITH KMS | 58d052e6e⋯00000 |
| 201k | SERVER CERTIFICATE | SERVER CERTIFICATE (.cer) USED FOR MUTUAL AUTHENTICATION FOR ESTABLISHING TLS COMMUNICATION WITH KMS | 143252e6e⋯00100 |

FIG. 4

KEY ENCRYPTION KEY LIST 200

| KEY ENCRYPTION KEY | HASH VALUE OF KEY ENCRYPTION KEY | KEY GENERATION DATE AND TIME |
|---|---|---|
| 129ab⋯c024 | 730012c⋯ab92 | 20191212100612 |
| 6bc09⋯5241 | 274929c⋯3142 | 20191210135315 |
| 92823⋯274a | 829417a⋯ed91 | 20180115193401 |

ENCRYPTION KEY MANAGEMENT TABLE  202

| | SETTING ITEM | MEANING | EXAMPLE OF VALUE |
|---|---|---|---|
| 202a | ENCRYPTION KEY ID | KEY ID FOR ENCRYPTING DATA OF STORAGE APPARATUS | 1 |
| 202b | POINTER TO ENCRYPTION KEY (ENCRYPTION) | VALUE OF POINTER TO STORAGE LOCATION (NON-VOLATILE MEMORY) OF ENCRYPTED ENCRYPTION KEY | 00EF2354 |
| 202c | POINTER TO ENCRYPTION KEY (DECRYPTED) | VALUE OF POINTER TO STORAGE LOCATION (VOLATILE MEMORY) OF DECRYPTED ENCRYPTION KEY | 123EAB00 |
| 202d | UNDECRYPTED FLAG | FLAG INDICATING WHETHER OR NOT ENCRYPTION KEY HAS BEEN DECRYPTED | 1 (UNDECRYPTED)/0 (DECRYPTED) |

FIG. 6

KEY ENCRYPTION KEY ADDITION ATTRIBUTE TABLE  300

| | ATTRIBUTE ITEM | MEANING | EXAMPLE OF VALUE |
|---|---|---|---|
| 300a | UUID | VALUE FOR UNIQUELY SPECIFYING KEY ENCRYPTION KEY IN KMS | B2BDC5A1B9D118A6DF8430ADA2C5DB33D9EF419975F767EE6AA56C13DB32DED2 |
| 300b | Object Group | TYPE OF DATA STORED IN KMS | R800:KEKdynamic |
| 300c | x-AddAttributeDate | DATE AND TIME GENERATED BY KMS | 20191202183809 |
| 300d | x-KeyMaterialFormatID | ID INCLUDING KEY ENCRYPTION KEY PROTECTION METHOD AND DATA STRUCTURE OF BACKUP DATA | 9 |
| 300e | x-ProductID | ID FOR UNIQUELY SPECIFYING STORAGE APPARATUS. MODEL NAME AND SERIAL NUMBER | R80090534 |
| 300f | x-HashAlgrithm | Hash ALGORITHM ID FOR CHECKING INTEGRITY OF KEK WHEN KEY MANAGEMENT FUNCTION IS KEK ACQUISITION 0:SHA-256 | 0 |
| 300g | x-Hash | Hash VALUE OF KEK_dynamic CALCULATED BY SHA-256 FOR CHECKING INTEGRITY OF KEK_dynamic WHEN KEY MANAGEMENT FUNCTION IS KEK_dynamic ACQUISITION | 58d052e6e4a77ceee29dfedda2211ccc576a0ed200000000000000000000000 |
| 300h | KEK_dynamic KEY DATA | KEY ENCRYPTION KEY DATA | 46d052e6e4a77ceee2edfacdda2521cdc681a0ed200000000000000000000000 |

FIG. 11

KEY ENCRYPTION KEY LIST    200

| KEY ENCRYPTION KEY 200a | HASH VALUE OF KEY ENCRYPTION KEY 200b | KEY GENERATION DATE AND TIME 200c | KEY MANAGEMENT SERVER NUMBER 200d |
|---|---|---|---|
| 129ab···c024 | 730012c···ab92 | 20191212100612 | 1 |
| 6bc09···5241 | 274929c···3142 | 20191210135315 | 1 |
| 92823···274a | 829417a···ed91 | 20180115193401 | 2 |

ENCRYPTION KEY MANAGEMENT TABLE   202

| | SETTING ITEM | MEANING | EXAMPLE OF VALUE |
|---|---|---|---|
| 202a | ENCRYPTION KEY ID | KEY ID FOR ENCRYPTING DATA OF STORAGE APPARATUS | 1 |
| 202b | POINTER TO ENCRYPTION KEY (ENCRYPTION) | VALUE OF POINTER TO STORAGE LOCATION (NON-VOLATILE MEMORY) OF ENCRYPTED ENCRYPTION KEY | 00EF2354 |
| 202c | POINTER TO ENCRYPTION KEY (DECRYPTED) | VALUE OF POINTER TO STORAGE LOCATION (VOLATILE MEMORY) OF DECRYPTED ENCRYPTION KEY | 123EAB00 |
| 202e | UNENCRYPTED FLAG | FLAG INDICATING WHETHER OR NOT ENCRYPTION KEY HAS BEEN ENCRYPTED | 1 (UNENCRYPTED)/0 (ENCRYPTED) |

ENCRYPTION KEY MANAGEMENT SYSTEM AND ENCRYPTION KEY MANAGEMENT METHOD

BACKGROUND OF THE INVENTION

1. Field of the Invention

The present invention relates to an encryption key management system and an encryption key management method, and in particular, to an encryption key management system and an encryption key management method for improving system reliability by allowing data to be restored in a storage apparatus that encrypts data even if the corresponding information is lost in a case where a key for encrypting the encryption key itself is stored in an external server.

2. Description of the Related Art

In recent years, in order to improve data security, a storage apparatus having an encryption function is used. In a storage apparatus having such an encryption function, data is encrypted using an encryption key and stored in a storage device, such as a Hard Disk Drive (HDD). In this case, when the encryption key is lost, the encrypted data cannot be decrypted. This is virtually equivalent to the loss of the data.

On the other hand, it is not preferable from the viewpoint of security to store the encryption key and the data encrypted by using the encryption key in the storage apparatus. This is because, if the entire storage apparatus is stolen, the encrypted data may be decrypted and the information may be leaked.

Therefore, for example, U.S. Pat. No. 8,010,810 has proposed a technique in which an encryption key is stored in a key management server separately from a storage apparatus and the storage apparatus acquires the encryption key from the key management server to use the encryption key when the encryption key is necessary.

The encryption key is assigned to each disk board including a drive and an encryption chip. When these are replaced with other parts for maintenance, the encryption key is acquired from the replaced parts and updated so that the data cannot be read. At this time, data can only be read from the drive with the latest encryption key set. Therefore, when the encryption key is updated, it is necessary to re-store the updated encryption key in the key management server and keep the key information of the key management server up-to-date at all times.

Since the encryption key of the key management server is managed independently of the storage apparatus, the administrator may accidentally delete the encryption key. In addition, after updating the encryption key, the storage apparatus may be stopped without the encryption key being stored in the key management server. In such a case, the encryption key is stored in the volatile area of the storage apparatus, and when the storage apparatus is stopped, the encryption key is lost from the storage apparatus. For this reason, when the storage apparatus is stopped in a state in which there is no encryption key in the key management server, the data cannot be decrypted. Therefore, for example, WO 2015/004706 A has proposed a control method for suppressing an instruction to stop a storage apparatus depending on the presence or absence of an encryption key in a key management server.

According to the storage apparatus disclosed in WO 2015/004706 A, it is possible to improve reliability and suppress the loss of key information.

However, considering that the storage apparatus may be stopped due to external factors such as a disaster and a power outage, software control cannot guarantee that the encryption key is present in the key management server. For this reason, until the encryption key is successfully stored in the key management server, it is necessary to store the encryption key in the non-volatile area of the internal memory of the storage apparatus having a faster access speed. However, due to the security concerns described above, a method is used in which another encryption key (key encryption key) generated by the key management server is used to encrypt the encryption key, the encrypted encryption key is stored in the non-volatile area inside the storage apparatus, and the key encryption key is stored in the key management server. In this method, the key number uniquely corresponding to the key encryption key is stored in the storage apparatus and used when acquiring the key encryption key from the key management server.

In the method of the storage apparatus, the encryption key holds a protected key pointer indicating the key number of the key encryption key for encrypting the encryption key itself as key information. In addition, in order to uniquely specify and acquire the key encryption key from the key management server, the storage apparatus stores the key number in the non-volatile area inside the storage apparatus. Then, when decrypting the encryption key, the key number of the key encryption key is specified from the protected key pointer and an inquiry about the key number is given to the key management server to obtain the key encryption key capable of decrypting the encryption key.

In the storage apparatus, however, in general, data in the non-volatile area may not be read due to factors such as a hardware failure and a Write abnormality. If the key number cannot be extracted, the key encryption key corresponding to the encryption key cannot be acquired from the key management server. Even if the key encryption key can be acquired manually from the key management server, it is not possible to access the information of the correspondence between the encryption key and the key encryption key. Therefore, in this case as well, the encryption key cannot be decrypted. As a result, the encryption key required for decrypting the data cannot be decrypted, and the data is virtually lost.

SUMMARY OF THE INVENTION

It is an object of the invention to provide an encryption key management system and an encryption key management method for improving system reliability by allowing data to be restored in a storage apparatus that encrypts data even if the corresponding information is lost in a case where a key for encrypting the encryption key itself is stored in an external server.

According to an aspect of the invention, there is provided an encryption key management system including: a storage apparatus that encrypts data with one or more encryption keys and stores the encrypted data; and one or more key management servers connected to the storage apparatus through a network. Each of the key management servers holds one or more key encryption keys for encrypting the encryption keys together with its attribute information. The storage apparatus holds the encryption keys encrypted by the key encryption keys. The storage apparatus sends a request for the key encryption key corresponding to the storage apparatus to the key management server using a storage apparatus ID for uniquely identifying the storage apparatus as a parameter. The storage apparatus acquires the key encryption key corresponding to the storage apparatus and its attribute information from the key management server. The storage apparatus stores the acquired key encryption key and its attribute information in a key encryption key list while eliminating the key encryption key that is duplicated. The storage apparatus attempts to decrypt the encryption key using the key encryption key stored in the key encryption key list, determines a success or failure of the decryption of the encryption key, and attempts to decrypt the encryption key using the key encryption key stored in the key encryption key list, which has not been attempted yet, when the decryption of the encryption key using the key encryption key fails.

According to the invention, it is possible to provide an encryption key management system and an encryption key management method for improving system reliability by allowing data to be restored in a storage apparatus that encrypts data even if the corresponding information is lost in a case where a key for encrypting the encryption key itself is stored in an external server.

BRIEF DESCRIPTION OF THE DRAWINGS

FIG. 3 is a diagram showing examples of a setting item and a value in a key management server management table;

FIG. 4 is a diagram showing an example of a key encryption key list in a first embodiment;

FIG. 5 is a diagram showing an example of an encryption key management table in the first embodiment;

FIG. 6 is a diagram showing examples of an attribute item and a value in a key encryption key addition attribute table;

FIG. 11 is a diagram showing an example of a key encryption key list in a second embodiment;

FIG. 12 is a diagram showing an example of an encryption key management table in the second embodiment;

DETAILED DESCRIPTION OF THE PREFERRED EMBODIMENTS

Hereinafter, each embodiment of the invention will be described with reference to FIGS. 1 to 21.

First Embodiment

Hereinafter, a first embodiment of the invention will be described with reference to FIGS. 1 to 10.

First, the configuration of an encryption key management system according to the first embodiment will be described with reference to FIGS. 1 and 2.

First, the overall configuration of the encryption key management system will be described with reference to FIG. 1.

Figure 1:
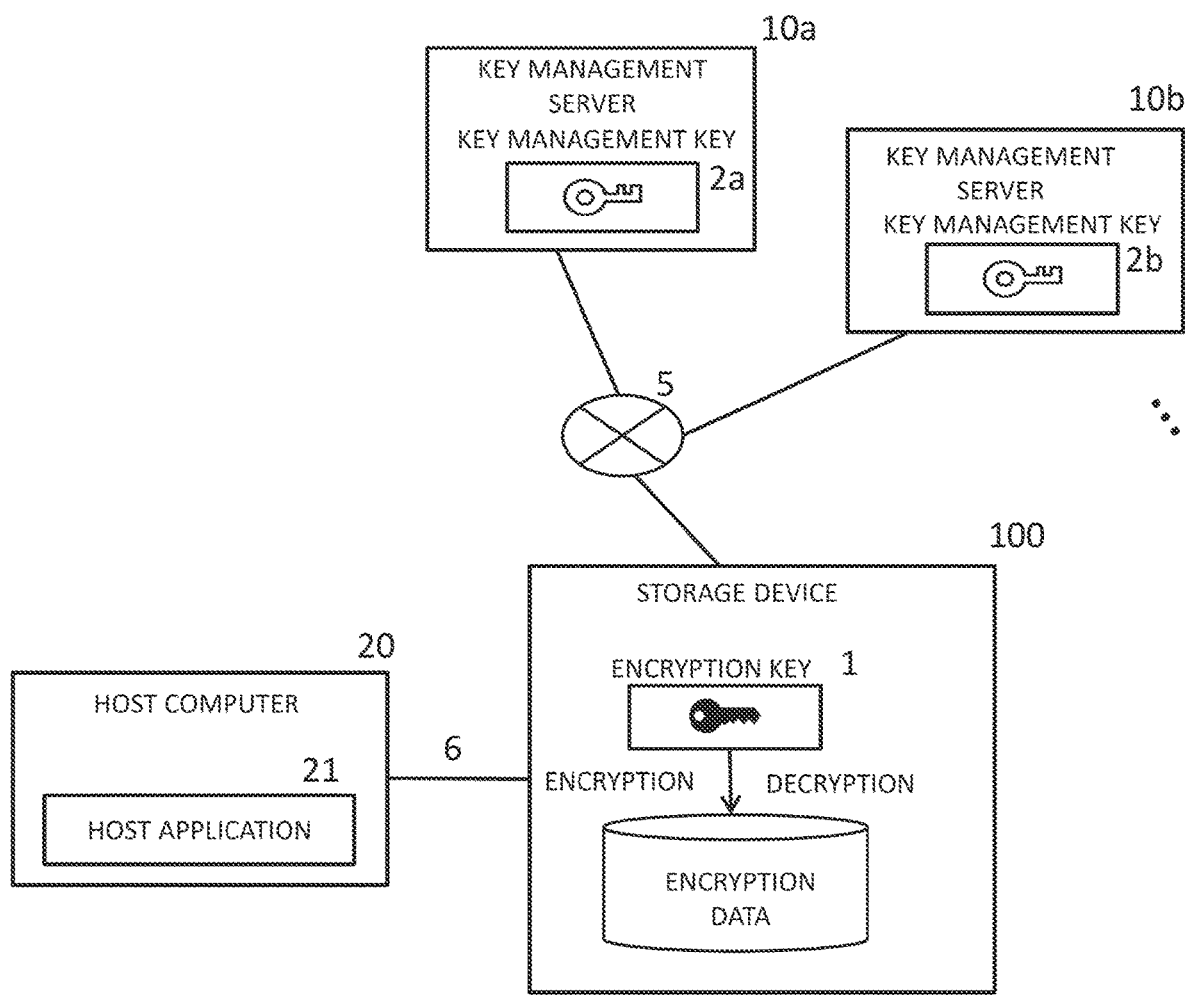
FIG. 1 is a block diagram showing the overall configuration of an encryption key management system.
Figure 2:
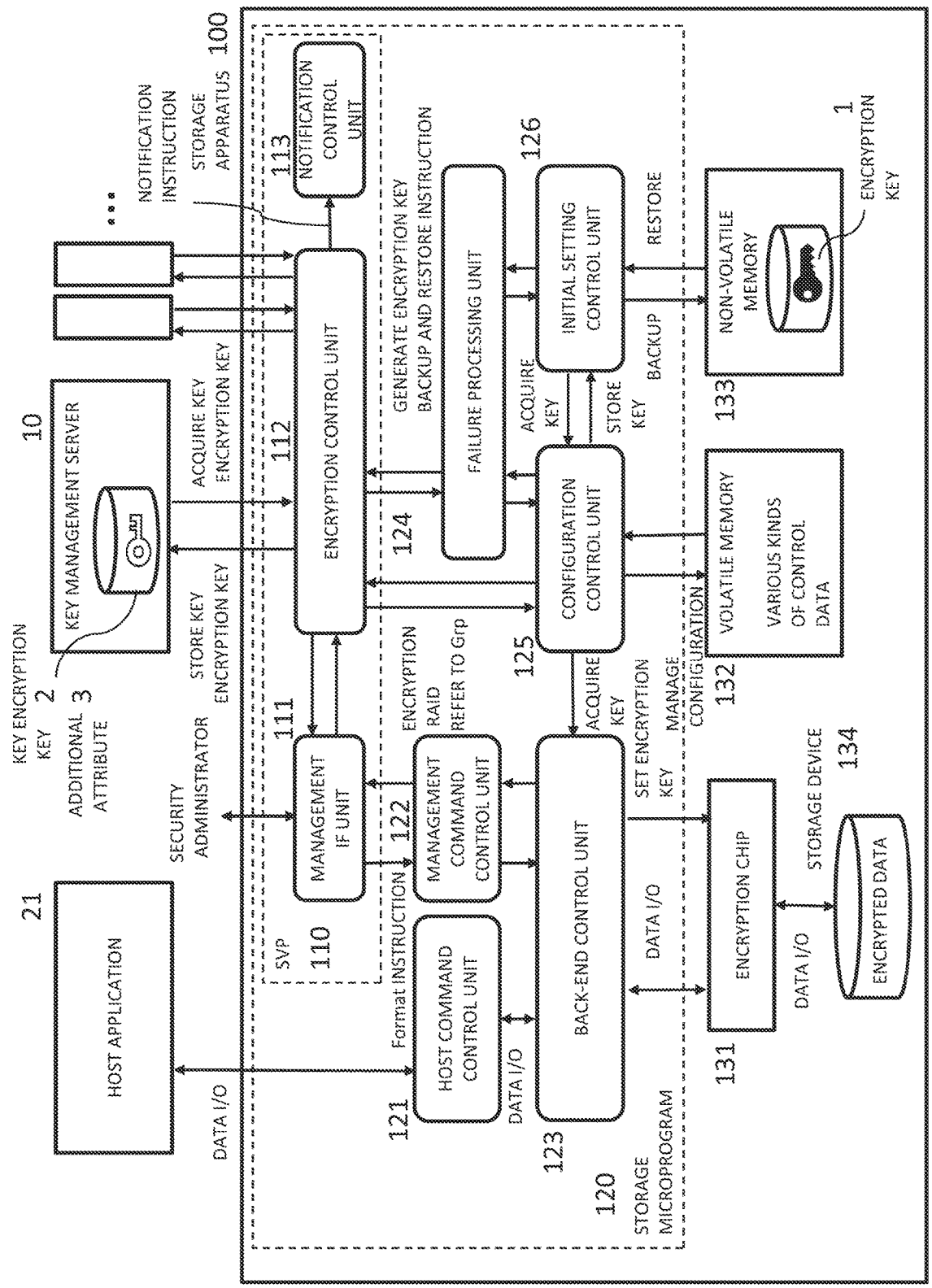
FIG. 2 is a functional configuration diagram of a storage apparatus.

The encryption key management system according to the present embodiment includes a host computer 20, a storage apparatus 100, and one or more key management servers 10 (denoted as a key management server 10*a*, a key management server 10*b*, . . . in FIG. 1). The host computer 20 and the storage apparatus 100 are connected to each other by a storage interface 6, and the storage apparatus 100 and the key management servers 10 are connected to each other by a network 5.

The storage interface 6 is a dedicated interface for connecting a storage apparatus and a host computer to each other, such as a Fibre Channel (FC) or an Internet Small Computer Interface (iSCSI). The network 5 may be a Local Area Network (LAN) or a global network such as the Internet.

The host computer 20 is a device that executes application software. For example, the host computer 20 has a database system mounted thereon, and issues an I/O command to the storage apparatus 100 to input and output data stored in the storage apparatus 100.

The storage apparatus 100 includes a Hard Disk Drive (HDD) or a Solid State Drive (SSD) as a storage device, and stores a large amount of data and reads and writes data according to the I/O command from the host computer 20. The storage apparatus 100 has an encryption key 1 for each control board. In the storage apparatus 100, data is encrypted with the encryption key 1 at the time of writing and data is decrypted with the encryption key 1 at the time of reading, thereby improving the data security. The encryption key 1 of the storage apparatus 100 is held in a form encrypted by a key encryption key 2 for encrypting the encryption key 1 itself.

The key management server 10 is a server that holds the key encryption key 2, and transmits information regarding the key encryption key 2 in response to a query from the storage apparatus 100. As also described in the related art, in this system, the key encryption key 2 is separately held in the key management server 10 to prevent the encryption key and data of the storage apparatus 100 from being stolen and improve the security of data. In addition, in the present embodiment, as shown in FIG. 1, a plurality of key management servers 10 are provided, and in order to increase redundancy, it is also assumed that a separate key management server 10 has the key encryption key 2 for the same encryption key 1.

Next, the functional configuration of a storage apparatus will be described with reference to FIG. 2.

The storage apparatus 100 has a program function executed by a SuperVisor Program (SVP) 110 and a function executed by a storage microprogram 120, and stores hardware resources.

The SVP 110 is a program executed in a supervisor mode, and realized functional units include a management InterFace (IF) unit 111, an encryption control unit 112, and a notification control unit 113.

The management IF unit 111 is a functional unit that controls an interface with a security administrator (system administrator). The encryption control unit 112 is a functional unit that controls encryption of data stored in a storage device, and the notification control unit 113 is a control unit that notifies the outside of information regarding encryption.

The storage microprogram 120 is a program that operates the storage apparatus 100, and functional units executed in a user mode (not in the supervisor mode) include a host command control unit 121, a management command control unit 122, a back-end control unit 123, a failure processing unit 124, a configuration control unit 125, and an initial setting control unit 126.

The host command control unit 121 is a functional unit that receives an I/O command and a setting command from the host application and gives an instruction to the back-end control unit 123. The management command control unit 122 is a functional unit that receives a command from the security administrator and gives an instruction to the back-end control unit 123. The back-end control unit 123 is a functional unit that performs I/O processing and encryption-related processing on data stored in a storage device 134 through an encryption chip. The failure processing unit 124 is a functional unit that performs failure processing relevant to encryption. The configuration control unit 125 is a functional unit that controls the configuration of the storage device of the storage apparatus 100 or other hardware and software configurations, and the initial setting control unit 126 is a functional unit that loads data to a non-volatile memory 133 or reads data from the non-volatile memory 133. The non-volatile memory 133 is a semiconductor storage device such as a flash memory, and is a memory where data is not deleted even when the power is turned off. The encrypted encryption key 1 is stored in the non-volatile memory 133.

A volatile memory 132 is a semiconductor storage device such as a RAM, and is a memory where data is deleted when the power is turned off. The volatile memory 132 stores a key encryption key list 200, a key management server information table 201, and an encryption key management table 202. In addition, the details of these tables will be described later.

The encryption control unit 112 of the storage apparatus 100 and the key management server 10 perform transmission and reception of information regarding the key encryption key 2 therebetween. The key management server 10 holds the key encryption key 2 and an additional attribute 3 associated therewith. The details of the additional attribute 3 will be described later.

Next, a data structure used in the encryption key management system according to the first embodiment will be described with reference to FIGS. 3 to 6.

The key management server information table 201 is a table that holds the information of the key management server 10. As shown in FIG. 3, the key management server information table 201 has setting items of key management server number 201a, cluster 201b, key encryption key generation 201c, host name/IP address 201d, port number 201e, the number of retries 201f, retry interval 201g, connection timeout time 201h, the maximum data length of SecretData 201i, client certificate and secret key 201j, and server certificate 201k.

The key management server number 201a means the number of the key management server. The cluster 201b means the number of the Key Management Service (KMS) cluster and primary/secondary. The key encryption key generation 201c means whether or not the server generates a key encryption key. The host name/IP address 201d means the host name or the IP address of the KMS. The port number 201d means the connection destination port number of the KMS. The number of retries 201f means the number of retries when communication with the KMS fails. The retry interval 201g means a retry interval when communication with the KMS fails. The connection timeout time 201h means a waiting time when making a connection with the KMS. The maximum data length of SecretData 201i means the maximum data length (byte) of SecretData supported by the KMS. The client certificate and secret key 201j means a PKCS #7 client certificate and a filed PKCS #12 file of a PKCS #8 secret key that are used for mutual authentication for establishing Transport Layer Security (TLS) communication with the KMS. The server certificate 201k means a server certificate (.cer) used for mutual authentication for establishing TLS communication with the KMS.

Next, a key encryption key list will be described with reference to FIG. 4.

The key encryption key list 200 is a list created for the storage apparatus 100 to perform processing relevant to the key encryption key. As shown in FIG. 4, the key encryption key list 200 has fields of a key encryption key 200a, a key encryption key hash value 200b, and a key generation date and time 200c.

The key encryption key 200a means data of the key encryption key 2 itself. The key encryption key hash value 200b means a hash value generated from the data of the key encryption key 2 itself. The key generation date and time 200c means a date and time when the key encryption key 2 is generated in the key management server 10.

Next, an encryption key management table will be described with reference to FIG. 5.

The encryption key management table 202 is a table for referring to the information of the encryption key in the storage apparatus 100. As shown in FIG. 5, the encryption key management table 202 has fields of an encryption key ID 202a, an encryption key (encryption) pointer 202b, an encryption key (decryption) pointer 202c, and an undecrypted flag 202d.

The encryption key ID 202a means an identifier for uniquely identifying the encryption key. The encryption key (encryption) pointer 202b means a pointer to the data storage area of data of the encrypted encryption key in the non-volatile memory. The encryption key (decryption) pointer 202c means a pointer to the data storage area of data of the decrypted encryption key in the volatile memory. The undecrypted flag 202d means a flag indicating whether or not the encrypted encryption key has been decrypted.

Next, a key encryption key addition attribute table will be described with reference to FIG. 6.

A key encryption key addition attribute table 300 is a table that stores information regarding the attributes of the key encryption key 2 stored in each key management server 10. As shown in FIG. 6, the key encryption key addition attribute table 300 has attribute items of UUID 300a, ObjectGroup 300b, x-AddAttributeDate 300c, x-KeyMaterialFormatID 300d, x-ProductID 300e, x-HashAlgrithm 300f, x-Hash 300g, and KEK_dynamic key data 300h.

The UUID 300a means a value for uniquely specifying the key encryption key in the KMS. The ObjectGroup 300b means the type of data stored in the KMS. The x-AddAttributeDate 300c means a date and time generated by the KMS. The x-KeyMaterialFormatID 300d means an ID including a key protection method and a data structure of backup data. The x-ProductID 300e means an ID for uniquely specifying the storage apparatus. For example, this is generated by combining the model name and the serial number of the apparatus. The x-HashAlgorithm 300f means a Hash algorithm ID for checking the integrity of the KEK when the key management function is KEK acquisition. For example, 0 means adopting "SHA-256" as an algorithm. The x-Hash 300g means a Hash value of KEK_dynamic calculated by SHA-256 for checking the integrity of KEK_dynamic when the key management function is KEK_dynamic acquisition. The KEK_dynamic key data 300h means data indicating a key encryption key.

Figure 7:
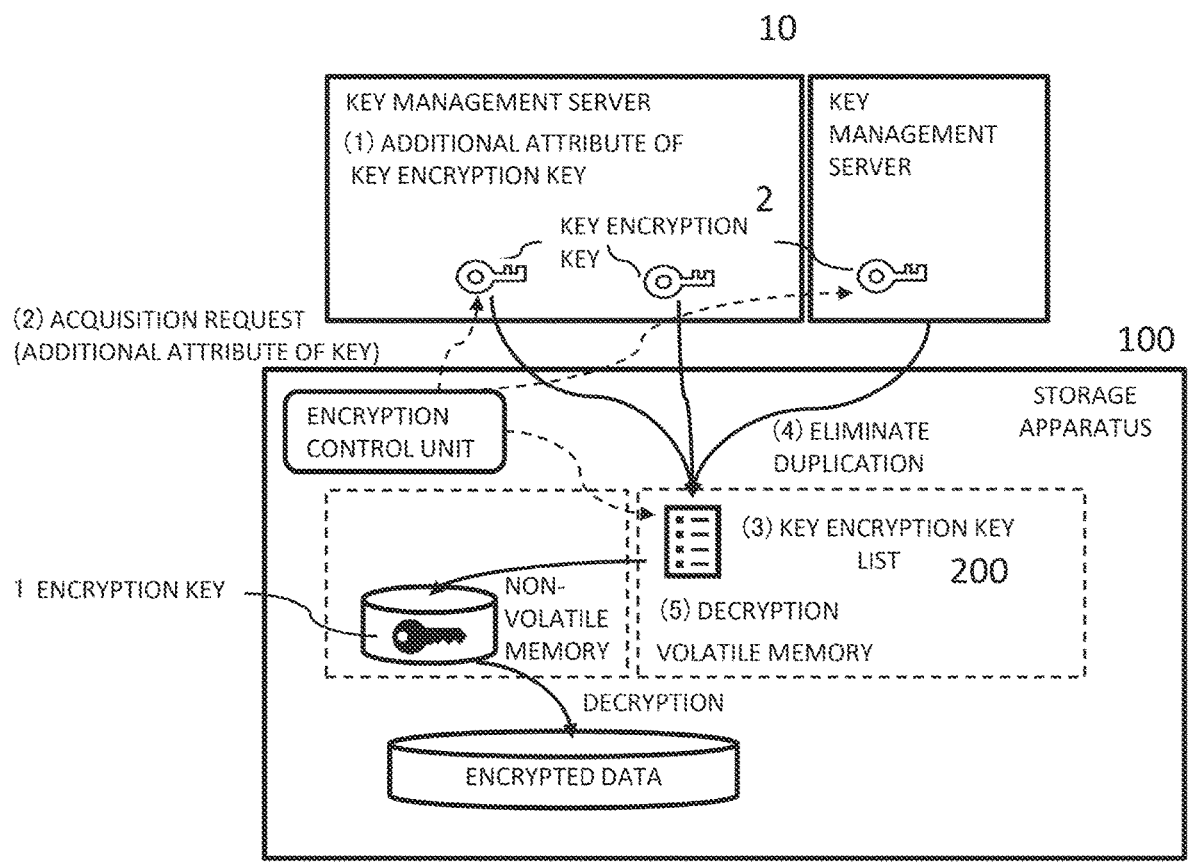
FIG. 7 is a diagram showing a series of processes from the acquisition of a key encryption key to the decryption of an encryption key of a storage apparatus in the first embodiment.
Figure 8:
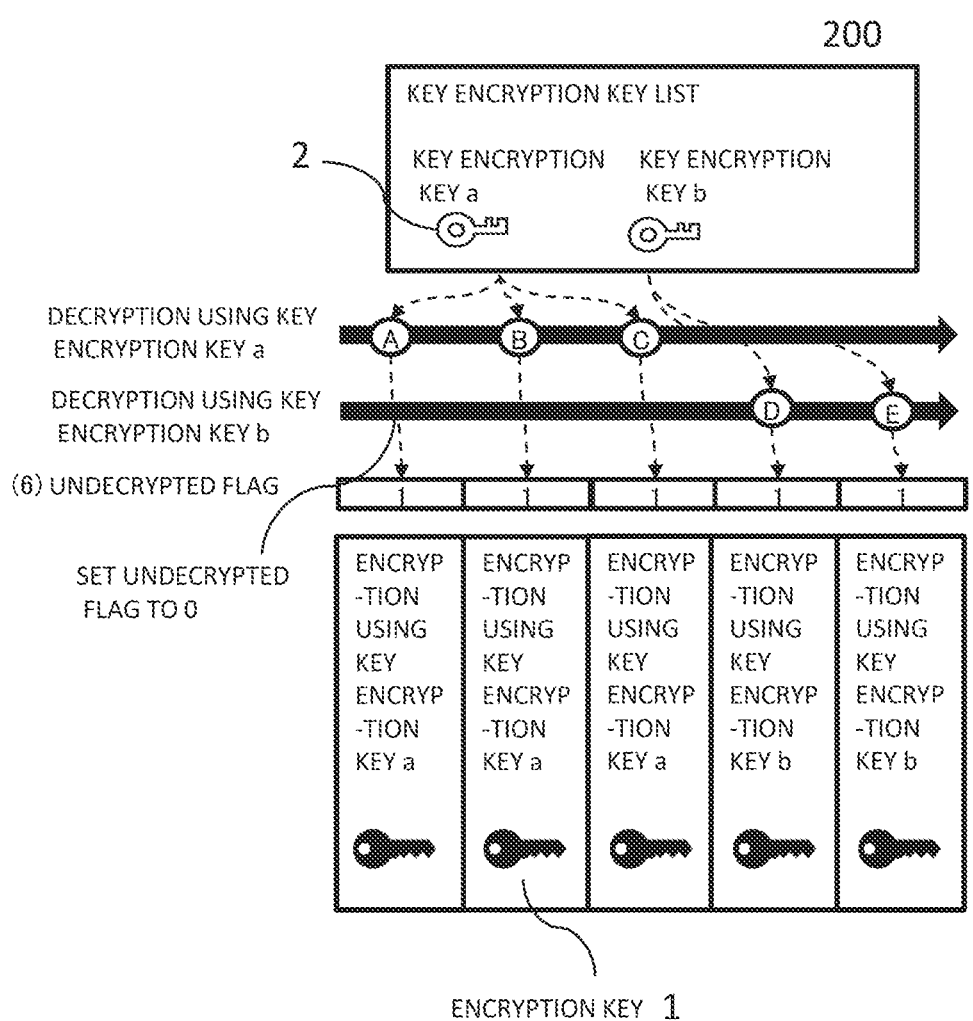
FIG. 8 is a diagram showing how an encryption key is decrypted by each key encryption key.

Next, the outline of the algorithm of the first embodiment will be described with reference to FIGS. 7 and 8.

The present embodiment is an encryption key management system in which the key encryption key 2 is acquired from the key management server 10 and decrypted using a method other than a method using a key number as described in the related art.

Hereinafter, description will be given in the order of FIG. 7.

(1) When storing the key encryption key 2 in the key management server 10, the following attribute values are assigned from the storage apparatus 100.

Key type (key encryption key)
ID for uniquely specifying the storage apparatus (product number (x-ProductID 300e or the like), model name, or the like)
Generation date and time of key encryption key (2) When acquiring the information of the key encryption key 2 from the key management server 10, the encryption control unit 112 assigns the key type (key encryption key) and the ID of the storage apparatus to the request query to make a request. Here, by the request query, requests are sent to all the key management servers 10 connected to the storage apparatus 100. In the present embodiment, it is intended that one encryption key is duplicated in a plurality of key management servers and the key encryption key is stored. This is because there is a possibility that a correct key encryption key can be acquired from another key management server 10 when the correct key encryption key 2 cannot be acquired from the key management server 10. In addition, in this request interface, when the key type is fixed, the key type is not always essential.

(3) The encryption control unit 112 calculates a hash value of the key encryption key 2 acquired by using the hash algorithm, associates the key encryption key 2 with the hash value in the storage apparatus, and stores these in the key encryption key list 200 as one record. When the duplication of the key encryption key is eliminated in the next process, the amount of calculation can be reduced by using the hash value.

(4) Here, when key encryption keys for encryption keys are stored in a plurality of key management servers 10 with redundancy, there is a high possibility that the same key will be acquired multiple times because requests are sent to a plurality of information-synchronized key management servers. Therefore, the encryption control unit 112 efficiently compares the key encryption keys 2 using the hash value of each key assigned to the key encryption key 2, and removes duplicate records in the key encryption key list 200 by leaving only one record in the key encryption key list 200 determined to be the same key encryption key 2.

(5) Records of a plurality of key encryption keys 2 may remain in the key encryption key list 200. In this case, the encryption control unit 112 acquires information of the record of the key encryption key 2 from the records in the order of the latest generation date, and attempts to decrypt the encryption key 1. Whether or not the decryption has been performed correctly can be checked by, for example, an AES Key Wrap algorithm used for encrypting the encryption key. The AES Key Wrap algorithm is an algorithm for wrapping the input data using integrity check data (IV) and an AES encryption algorithm. That is, whether or not the data could be correctly decrypted can be determined according to whether or not 128 bits from the beginning of the decrypted data match IV (0xA6A6A6A6A6A6A6A6).

(6) The encryption control unit 112 attempts to decrypt all the encryption keys 1. For an encryption key that has failed to decrypt, the encryption control unit 112 attempts to decrypt the encryption key using the key encryption key 2 of the next record of the key encryption key list 200. FIG. 8 shows that an encryption key A, an encryption key B, and an encryption key C are decrypted by a key encryption key a and an encryption key D and an encryption key E are decrypted by a key encryption key b. This is because there is a possibility that the encryption key is encrypted with a plurality of key encryption keys when interruption occurs due to a failure or the like during the update of the key encryption key. Here, when the encryption key management table 202 is initialized, the undecrypted flag 202d is set to 1, and the undecrypted flag of the encryption key that has been successfully decrypted is set to 0. The process ends when all the undecrypted flags become 0.

According to the encryption key management system of the present embodiment, even if the key number stored in the storage apparatus 100 is lost or even if the key number is not stored in the storage apparatus 100, the key encryption key 2 corresponding to the encryption key 1 can be acquired from the key management server 10 to decrypt the encryption key 1.

Figure 9:
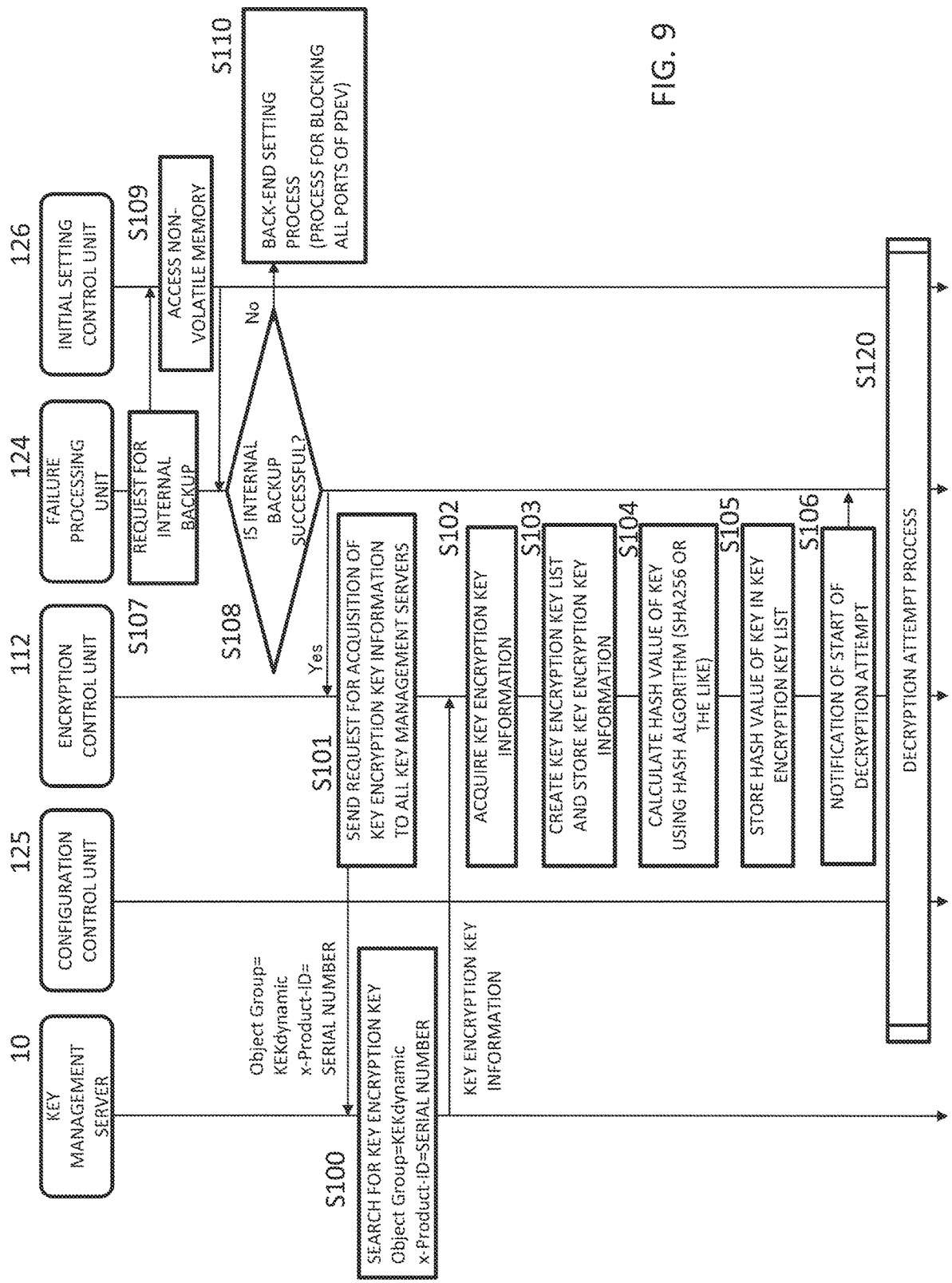
FIG. 9 is a UML sequence diagram showing the details of a process of an encryption key management system according to the first embodiment.
Figure 10:
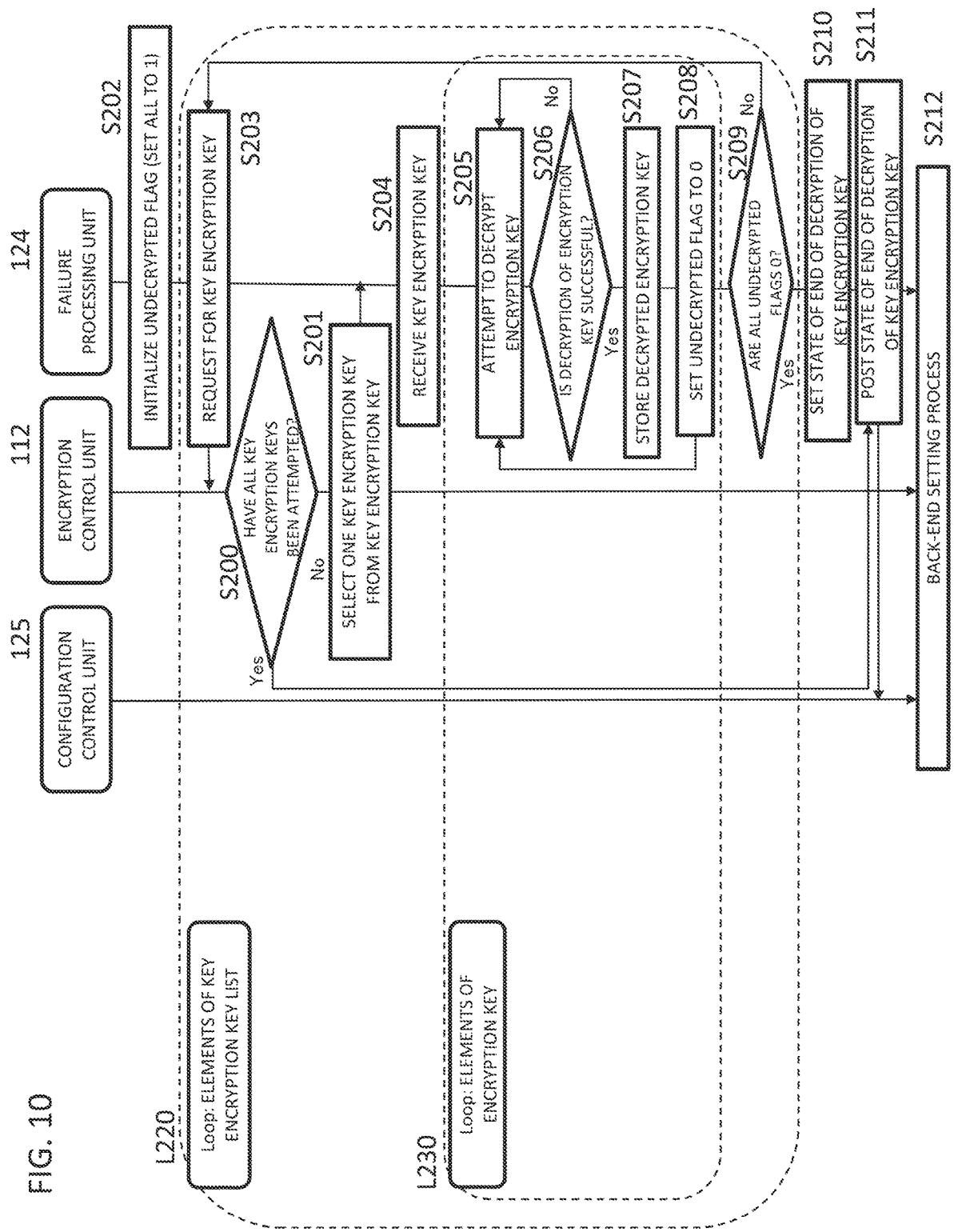
FIG. 10 is a UML sequence diagram showing the details of a decryption attempt process.

Next, the details of the process of the encryption key management system according to the first embodiment will be described with reference to FIGS. 9 and 10.

A failure processing unit 124 sends a request for internal backup to the initial setting control unit 126 (S107).

The initial setting control unit 126 accesses the nonvolatile memory 133 (S109) to transfer the internal backup. Or, when an error occurs, the initial setting control unit 126 notifies the failure processing unit 124 that an error has occurred.

Based on the reply from the initial setting control unit 126, the failure processing unit 124 determines whether or not the internal backup is successful (S108). When the internal backup is successful (S108: Yes), the failure processing unit 124 notifies the encryption control unit 112 that the internal backup is successful. When the internal backup fails (S108: No), the failure processing unit 124 performs a back-end setting process (S110). The back-end setting process is, for example, a process for blocking all ports of Physical Device (PDEV).

Then, the encryption control unit 112 specifies parameters (key type and storage ID), and sends a request for acquisition of key encryption key information corresponding to the encryption key 1 to all of the connected key management servers 10 (S101).

Then, the key management server searches for the key encryption key based on the received parameters (S100), and transmits the key encryption key information to the encryption control unit 112.

Then, the encryption control unit 112 acquires the key encryption key information from the key management server 10 (S102).

Then, the encryption control unit 112 creates the key encryption key list 200 shown in FIG. 4 and stores the acquired key encryption key information (S103).

Then, the encryption control unit 112 calculates a hash value of the key encryption key according to a hash algorithm, such as SHA256 (S104).

Then, the encryption control unit 112 stores the calculated hash value of the key encryption key 2 in the key encryption key list 200 (S105). At this time, for the key encryption key 2 with the same hash value, the record is deleted.

Then, the encryption control unit 112 notifies the failure processing unit 124 of the start of the decryption attempt of the encryption key 1 (S106).

Then, the storage apparatus 100 performs an encryption key decryption attempt process (S120).

Next, the encryption key decryption attempt process will be described in detail with reference to FIG. 10. This is a process corresponding to S120 in FIG. 9.

First, the failure processing unit 124 initializes the undecrypted flag shown in FIG. 5 to 1 (undecrypted) (S202).

Then, the storage apparatus 100 performs loop processing of S200, S201, S203, S204, and L230 (L220).

In the loop processing of L220, first, the failure processing unit 124 sends a request for the key encryption key to the encryption control unit 112 (S203).

Then, the encryption control unit 112 determines whether or not encryption key decryption processes using all the key encryption keys have been attempted (S200). When all the decryption processes have been attempted (S200: Yes), the process proceeds to S211. When all the decryption processes have not been attempted (S200: No), the process proceeds to S201.

When all the decryption processes have not been attempted, one of the pieces of key encryption key data is selected from the key encryption key list 200 and transmitted to the failure processing unit 124 (S201), and the failure processing unit 124 receives the data of the key encryption key 2 (S204).

Then, the failure processing unit 124 performs loop processing of L230 for the elements of all the encryption keys in the encryption key management table 202 of FIG. 5.

In the loop processing of L230, first, the failure processing unit 124 attempts to decrypt the encryption key 1 based on the received data of the key encryption key 2 (S205), and determines whether or not the decryption of the encryption key 1 is successful (S206). When the decryption is successful (S206: Yes), the data of the decrypted encryption key 1 is stored in the volatile memory 132 (S207), and the undecrypted flag is set to 0 (decryption) (S208). When the decryption is not successful (S206: No), the process returns to S205 to attempt the decryption again.

After exiting the loop processing of L230, the failure processing unit 124 determines whether or not all the undecrypted flags are 0 (S209). When all the undecrypted flags are 0 (S209: Yes), the failure processing unit 124 exits the loop processing of L230 and proceeds to S210. When there is an undecrypted flag that is not 0 (S209: No), the process returns to S203.

When exiting the loop processing of L230, the failure processing unit 124 sets a state in which the acquisition of the key encryption key 2 has ended (S210), and posts the end of the encryption key decryption processing to the configuration control unit 125 (S211).

Thereafter, the storage apparatus 100 performs a back-end setting process (S212). In the back-end setting process, it is possible to decrypt and read the data stored in the storage device 134 using the decrypted encryption key 1 or to encrypt and write the data from the host application 21 using the decrypted encryption key 1.

As described above, according to the present embodiment, even when there is no key number or the key number is lost, a key encryption key corresponding to a key encryption key used for the encryption of the data can be acquired from the key management server to decrypt the encryption key. Therefore, even if the key number is lost due to a hardware failure or a human error, the data can be decrypted, so that the reliability of the system can be improved. In addition, since the intermediate data or the decrypted encryption key is stored in the volatile memory, the data security is not affected.

Second Embodiment

Hereinafter, a second embodiment of the invention will be described with reference to FIGS. 11 to 17.

In the first embodiment, even when the key number for the encryption key cannot be acquired, the key encryption key for the encryption key is acquired from the key management server, and the encrypted encryption key is decrypted by the key encryption key.

In the present embodiment, in the encryption key management system having almost the same configuration, even when the key number for the encryption key cannot be acquired, the key encryption key for the encryption key in the storage apparatus can be updated, so that the security of data can be improved.

Hereinafter, in the present embodiment, differences from the first embodiment will be mainly described.

Originally, keeping the same key encryption key has a risk of attack or theft from a malicious person or the like. For this reason, it is desirable to regularly update the key encryption key stored in the key management server.

In the conventional method, the key number of the key encryption key corresponding to the encryption key is held in the non-volatile memory of the storage apparatus.

In this method, however, the data in the non-volatile memory may not be read due to factors such as a hardware failure and a Write abnormality. For this reason, it may not be possible to access the key number. When it is not possible to access the key number, it is not possible to acquire the key number in the conventional method of acquiring the key encryption key using the key number, and as a result, the key encryption key cannot be updated.

As described above, if the same key is used for a long period of time, the risk of data theft increases due to leakage or theft, so the key encryption key should be updated.

However, when it is not possible to access the key number, there is an endless security risk. As a result, the security of data is significantly reduced. This condition may not be acceptable depending on the customer's security policy.

The encryption key management system according to the present embodiment solves such a problem.

First, a data structure used in an encryption key management system according to the second embodiment will be described with reference to FIGS. 11 and 12.

As shown in FIG. 11, a key encryption key list 200 of the second embodiment is different from the key encryption key list 200 shown in FIG. 4 of the first embodiment in that a key management server number 200*d* is added.

The key management server number 200*d* means the number of the key management server.

As shown in FIG. 12, an encryption key management table 202 of the second embodiment is different from the encryption key management table 202 shown in FIG. 5 of the first embodiment in that the undecrypted flag 202*d* is removed and an unencrypted flag 200*e* is added.

The unencrypted flag 202*e* means a flag indicating whether or not the decrypted encryption key has been encrypted.

Figure 13:
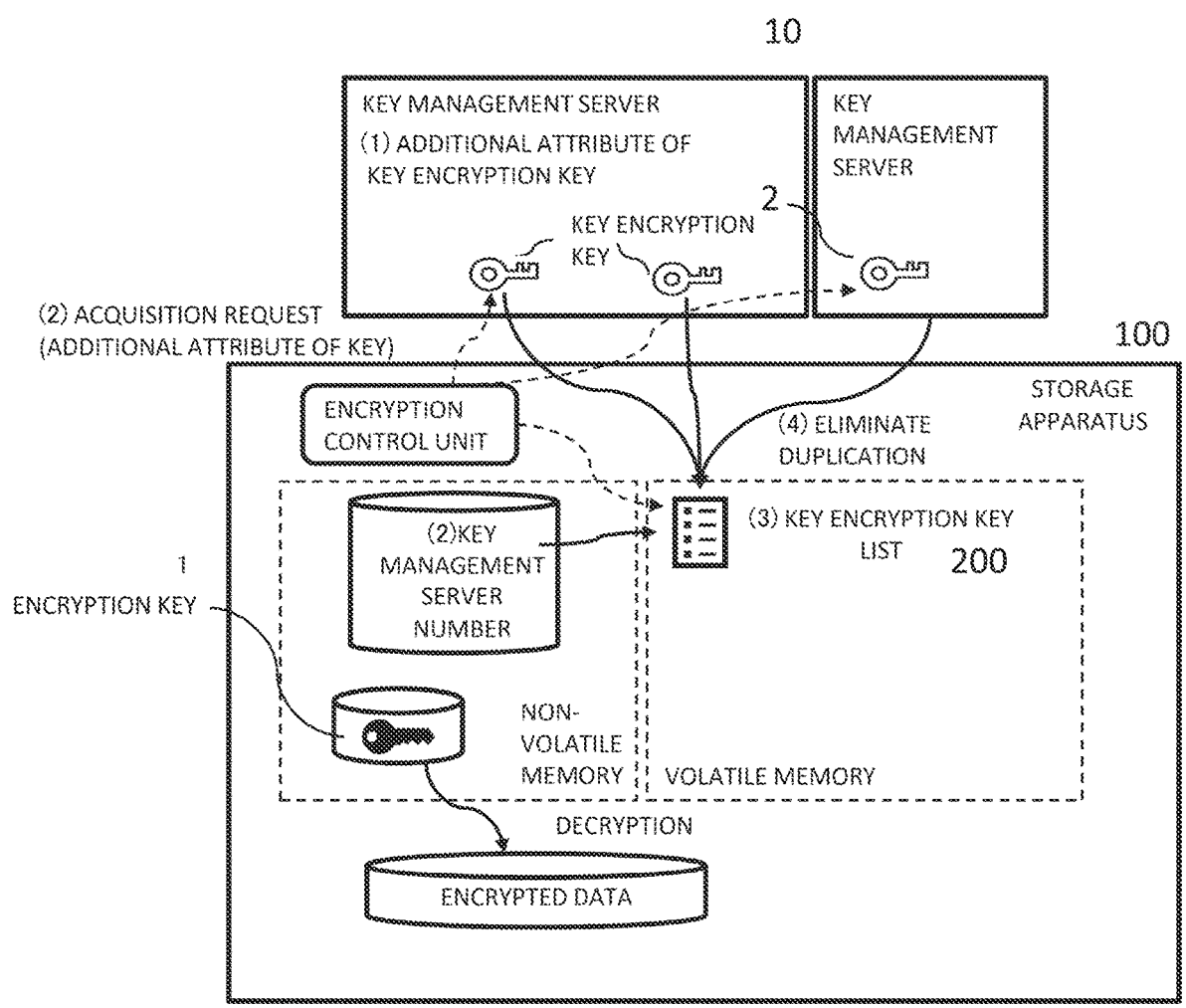
FIG. 13 is a diagram showing a series of processes from the acquisition of an old key encryption key and a new key encryption key to the update of an encryption key of a storage apparatus in the second embodiment.

Next, the outline of the algorithm of the second embodiment will be described with reference to FIGS. 13 and 14.

The present embodiment is an encryption key management system in which the key encryption key 2 for update is acquired from the key management server 10 and the encryption key is updated in the storage apparatus 100 using a method other than a method using a key number as described in the related art. Here, it is assumed that only one key encryption key 2 corresponding to the encryption key 1 of the storage apparatus 100 is present in the same key management server 10 under normal conditions.

Hereinafter, description will be given in the order of FIG. 13.

(1) When storing the key encryption key 2 in the key management server 10, the following attribute values are assigned from the storage apparatus 100.

Key type (key encryption key)

ID for uniquely specifying the storage apparatus (product number, model name, or the like)

Generation date and time of key encryption key (2) When acquiring the information of the key encryption key 2 from the key management server 10, the encryption control unit 112 assigns the key type (key encryption key) and the ID of the storage apparatus to the request query to make a request. Here, by the request query, requests are sent to all the key management servers 10 connected to the storage apparatus 100. In the present embodiment, it is intended that one encryption key is duplicated in a plurality of key management servers and the key encryption key is stored. This is because there is a possibility that a correct key encryption key can be acquired from another key management server 10 when the correct key encryption key 2 cannot be acquired from the key management server 10. In addition, in this request interface, when the key type is fixed, the key type is not always essential.

In addition, the encryption control unit 112 stores the key management server number of the key management server 10 in the storage apparatus 100, and associates the key management server number with the key encryption key when acquiring the key encryption key.

(3) The encryption control unit 112 calculates a hash value of the key encryption key 2 acquired by using the hash algorithm, associates the key encryption key 2 with the hash value in the storage apparatus, and lists and stores these in the key encryption key list 200 as one record. In addition, the key management server number in (2) is also stored in association with the key encryption key 2.

(4) The encryption control unit 112 eliminates the duplication of the key encryption key by using the hash value. When there are duplicates, a record with a smaller key management server number is preferentially left.

(5) The encryption control unit 112 sorts the key encryption key list 200 from the new date to the old date according to the generation date and time.

(6) When there are two or more records with the same key management server number, it is determined that the update has failed in the past. In the case of re-update from the state in which update has failed, a key encryption key with the latest generation date is used as a key encryption key for update. FIG. 14 shows a case of re-update from the state in which update has failed.

When the update is successful (when there is only one key management server number) or when the update is forcibly performed, a request is sent to the key management server to generate and acquire a new key encryption key for update.

(7) The unencrypted flag of the encryption key management table 202 is set to 1 (not encrypted).

(8) Decryption of the encryption key 1 is attempted with a key encryption key having a new generation date. Whether or not the decryption has been performed correctly can be checked by, for example, an AES Key Wrap algorithm used for encrypting the encryption key. That is, whether or not the data could be correctly decrypted can be determined according to whether or not 128 bits from the beginning of the decrypted data match IV (0xA6A6A6A6A6A6A6A6).

Figure 14:
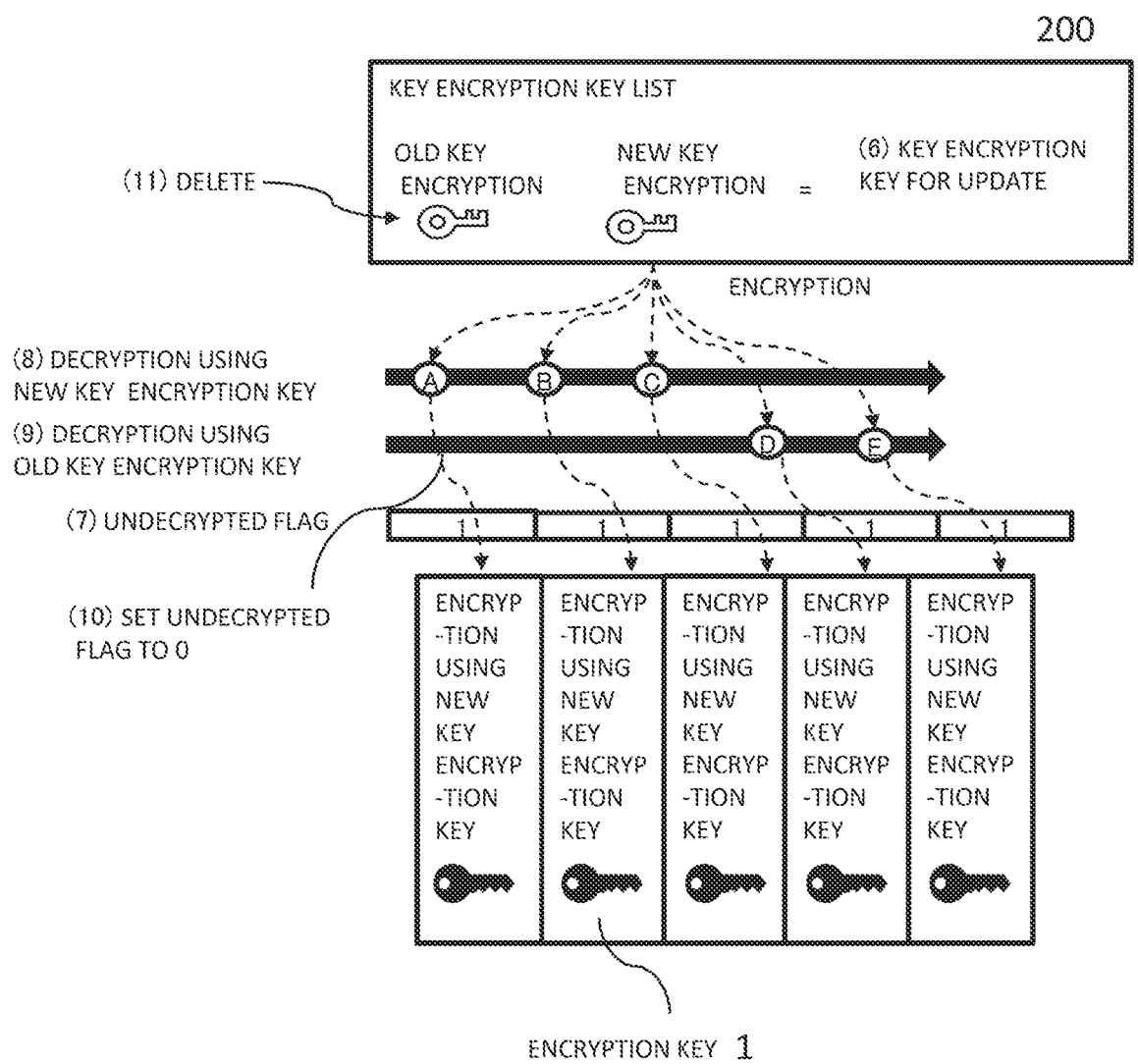
FIG. 14 is a diagram showing how the encryption key is decrypted and encrypted by each key encryption key.

In FIG. 14, it is assumed that an encryption key A, an encryption key B, and an encryption key C have been successfully decrypted. At this time, each encryption key is encrypted with a key encryption key for update (in the case of re-update, a key encryption key with the latest generation date), and the unencrypted flag is set to 0 (encrypted).

(9) For the encryption key that has failed in (8), decryption is attempted with the old key encryption key (key encryption key with the next generation date of the key encryption key attempted in (8)). Whether or not the decryption is successful can be determined by the method described in (8). In the example of FIG. 14, it is assumed that an encryption key D and an encryption key E are successfully decrypted with old key encryption keys. At this time, each encryption key is encrypted with a key encryption key for update (in the case of re-update, a key encryption key with the latest generation date), and the unencrypted flag is set to 0 (encrypted). When the decryption by the old key encryption key fails and the key encryption key with an older generation date and time is present in the key encryption key list 200, the decryption of the encryption key by the key encryption key with the next old generation date and time and the encryption of the key encryption key for update are attempted in the same manner.

(10) When the update is successful (when there is only one key management server number) or when the update is forcibly performed, the encryption key is decrypted by the key encryption key uniquely determined for the encryption key, the decrypted encryption key is encrypted by the generated key encryption key for update, and the unencrypted flag is set to 0 (encrypted).

(11) When all the unencrypted flags become 0 (encrypted), all the key encryption keys other than the key encryption key for update are deleted from the key management server. If none of the unencrypted flags are 0, this means that the encryption key has not been encrypted with the key encryption key for update. In this case, when the operation of the encryption key management system is set to manually update the key encryption key, the operator is notified of abnormal termination using a monitor or the like. When the operation of the encryption key management system is set to automatically update the key encryption key, the system is notified of the abnormality and processing for automatically updating the key encryption key is performed.

In addition, the unencrypted flag may be stored in the non-volatile memory inside the storage apparatus, and when an abnormality occurs, the key encryption key update processing may be performed only for the key having an unencrypted flag of 1.

As described above, according to the present embodiment, not only when the key number cannot be acquired and the update of the key encryption key is successful but also when the update of the key encryption key is abnormally terminated on the way, it is possible to restore the encryption key management system having a correspondence between the encryption key of the storage apparatus and the key encryption key in the key management server by regarding the key encryption key with a new generation date and time as a key encryption key for update.

Figure 16:
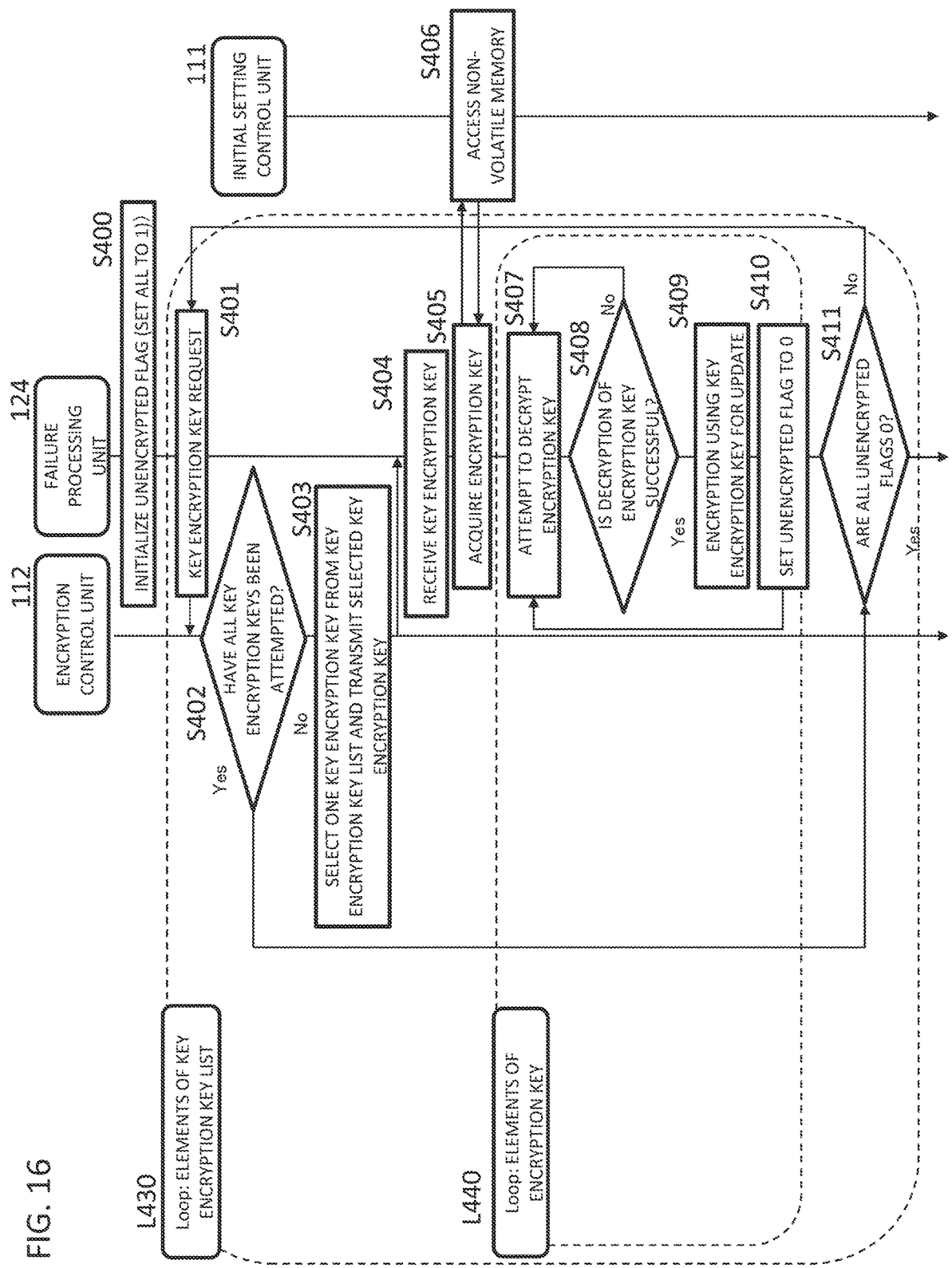
FIG. 16 is a UML sequence diagram showing the details of a key encryption key update process.
Figure 17:
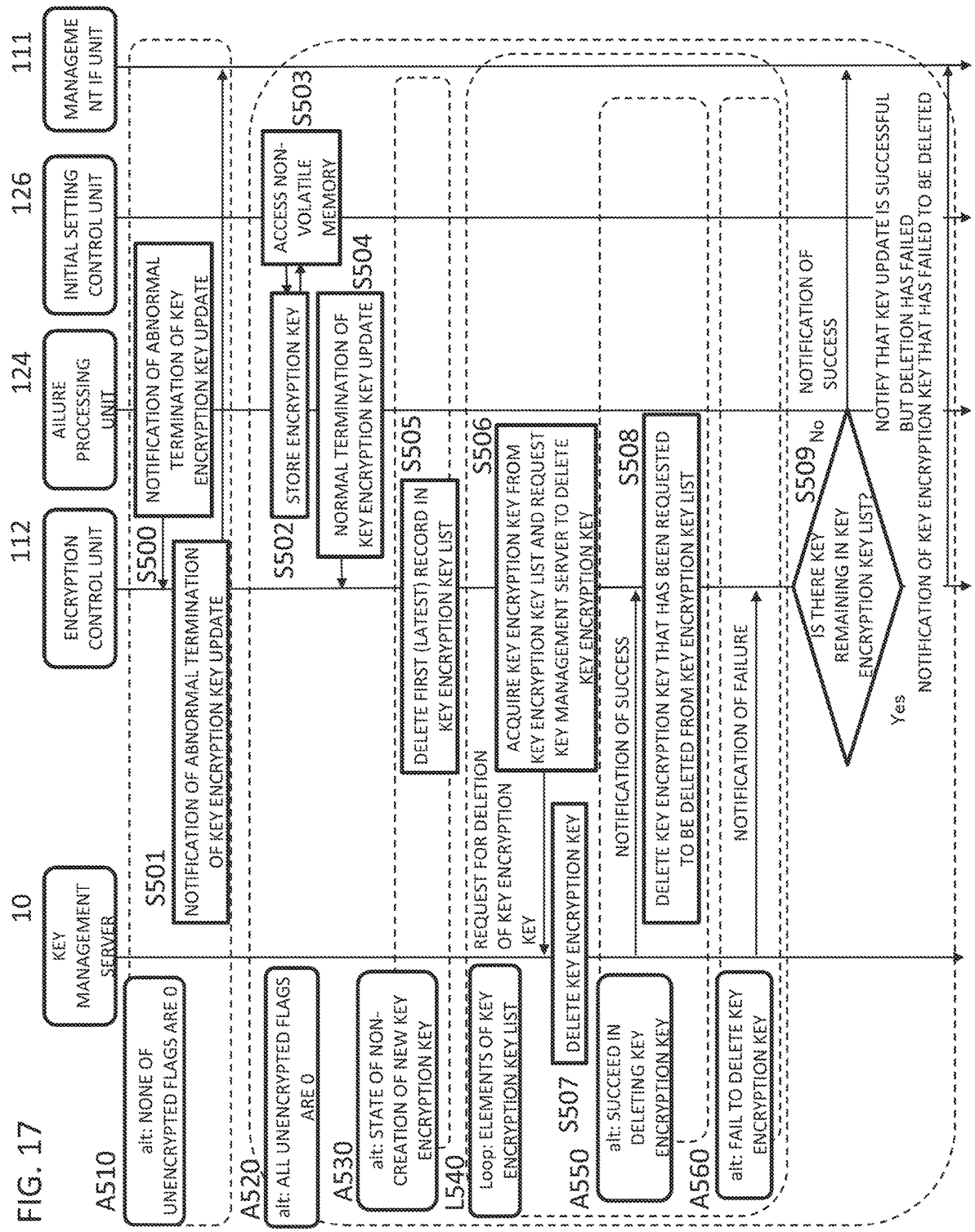
FIG. 17 is a UML sequence diagram showing the details of key encryption key update post-processing in the case of manual update in the second embodiment.

Next, the details of the process of the encryption key management system according to the second embodiment will be described with reference to FIGS. 15 to 17.

In the case of key encryption key update pre-processing in the case of manual update, first, the management IF unit 111 sends a request for key encryption update to the encryption control unit 112. This key encryption update request is for manual update under normal conditions or for forcible update.

Then, the encryption control unit 112 specifies parameters (key type and storage ID) for all of the connected key management servers 10, and makes a request to acquire the information of the key encryption key 2 corresponding to the encryption key 1 (S300).

Then, the key management server searches for the key encryption key based on the received parameters (S301), and transmits the attribute information of the key encryption key to the encryption control unit 112.

Then, the encryption control unit 112 calculates a hash value of the key encryption key according to a hash algorithm, such as SHA256 (S302).

Then, the encryption control unit 112 stores the received attribute information of the key encryption key 2, the hash value of the key encryption key 2, and the key encryption key number in the key encryption key list 200 shown in FIG. 11 (S303).

Then, the encryption control unit 112 eliminates the duplication of records for the key encryption key 2 having the same hash value (S304). At this time, a record with a smaller key management server number is preferentially left.

Then, the encryption control unit 112 sorts the key encryption key list 200 in order of the generation date and time of the key encryption key (S305).

When there are less than two records with the same key management server number in the key encryption key list 200 or when the key encryption update request from the management IF unit is for forcible update (A330), the encryption control unit 112 transmits the attribute information (including the storage ID) of the encryption key 1 to the key management server 10 to make a request for the generation of the key encryption key 2 (S306).

The key management server 10 generates a new key encryption key 2 (S307), and transmits the attribute information of the key encryption key 2 to the encryption control unit 112.

The encryption control unit 112 sets the acquired key encryption key 2 as a key encryption key for update, and sets the state to new creation of the key encryption key for update (S308).

When there are two or more records with the same key management server number in the key encryption key list 200 (A340), the encryption control unit 112 sets the key encryption key data of the first record (with a small key management server number and a new generation date and time) of the key encryption key list 200 as a key encryption key for update (S309).

The encryption control unit 112 sets the state to non-creation of a new key encryption key for update (S310).

Then, the encryption control unit 112 notifies the failure processing unit 124 of the key encryption key for update (S311).

Then, the encryption control unit 112 notifies the failure processing unit 124 of the key encryption key update process (S312).

Then, the encryption key management system performs the key encryption key update process (S320). The details of the key encryption key update process will be described later with reference to FIG. 16.

Then, the storage apparatus performs key encryption key update post-processing (S330). The details of the key encryption key update post-processing will be described later with reference to FIG. 17.

Hereinafter, the key encryption key update process will be described in detail with reference to FIG. 16.

Figure 15:
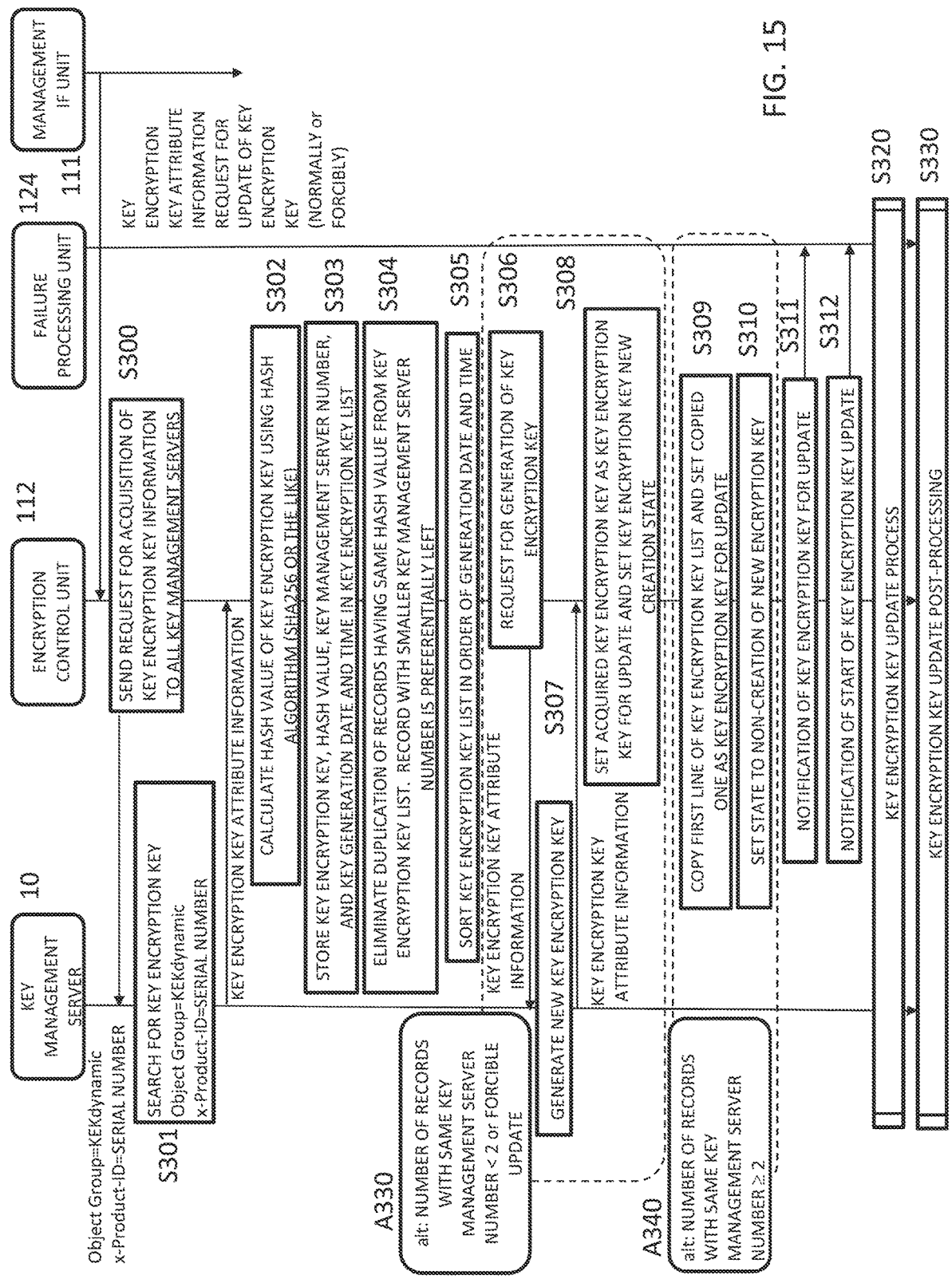
FIG. 15 is a UML sequence diagram showing the details of key encryption key update pre-processing in the case of manual update in the second embodiment.

This is a process corresponding to S320 in FIG. 15.

First, the failure processing unit 124 initializes the unencrypted flag shown in FIG. 12 to 1 (unencrypted) (S400).

Then, the storage apparatus 100 performs loop processing of S401 to S405, L440, and S411 for all the key encryption keys in the key encryption key list 200 (L430).

In the loop processing of L430, first, the failure processing unit 124 sends a request for the key encryption key to the encryption control unit 112 (S401).

The encryption control unit 112 determines whether or not the key encryption key update process has been attempted for all the key encryption keys 2 (S402). When the key encryption key update process has been attempted for all the key encryption keys 2 (S402: Yes), the encryption control unit 112 ends the key encryption key update process. When there is a key encryption key 2 for which the key encryption key update process has not been attempted (S402: No), the encryption control unit 112 selects one key encryption key in order from the key encryption key list 200 and transmits the selected key encryption key to the failure processing unit 124 (S403).

In response to this, the failure processing unit 124 receives the key encryption key from the encryption control unit 112 (S404).

Then, the failure processing unit 124 sends a request for the encryption key to the initial setting control unit 126, the initial setting control unit 126 accesses the non-volatile memory (S406) to transmit the encryption key to the failure processing unit 124, and the failure processing unit 124 acquires the encryption key (S405).

Then, the storage apparatus 100 performs loop processing of S407 to 5410 for the acquired encryption key (L440).

In the loop processing of L440, first, the failure processing unit 124 attempts to decrypt the encryption key using the key encryption key (S407), and determines whether or not the decryption of the encryption key is successful (S408). When the decryption of the encryption key is successful (S408: Yes), the process proceeds to S409. When the decryption of the encryption key fails (S408: No), the process proceeds to S407 to attempt the decryption of the next encryption key.

When the decryption of the encryption key is successful, the decrypted encryption key is encrypted with the key encryption key for update (S409), and the unencrypted flag corresponding to the encryption key is set to 0 (encrypted).

When exiting the loop processing of L440, the failure processing unit 124 determines whether or not all the unencrypted flags are 0 (encrypted) (S411). When all the unencrypted flags are 0 (S411: Yes), the failure processing unit 124 exits the loop of L430 to end the key encryption key update process. When there is an unencrypted flag that is not 0 (S411: No), the process returns to S401 to perform the loop processing of L430 for the next key encryption key.

Then, the details of the key encryption key update post-processing in the case of manual update will be described with reference to FIG. 17.

In the key encryption key update post-processing in the case of manual update, when none of the unencrypted flags are 0 (encrypted) (A510), the failure processing unit 124 notifies the encryption control unit 112 of the abnormal termination of the key encryption key update (S500), and the encryption control unit 112 notifies the management IF unit 111 of the abnormal termination of the key encryption key update (S501).

When all the unencrypted flags are 0 (encrypted) (A520), the failure processing unit 124 transmits the encrypted encryption key to the initial setting control unit 126, and the initial setting control unit 126 accesses the non-volatile memory 133 (S503) to store the encrypted encryption key (S502), and notifies the encryption control unit 112 that the key encryption key update has normally ended (S504).

Then, when the state of the encryption control unit 112 is non-creation of a new key encryption key for update (S310) (A530), the first record (corresponding to the key encryption key used for the key encryption key for update) in the key encryption key list 200 is deleted (S505). This means that the key management server is not requested to delete the key encryption key used for the key encryption key for update by the following S506.

Then, the encryption control unit 112 performs loop processing of S506 to S508 for each record of the key encryption key list 200 (L540).

The encryption control unit 112 extracts a key encryption key and a key management server number from the key encryption key list 200, and sends a deletion request to the key management server 10 (S506).

The key management server 10 deletes the key encryption key in response to the request (S507).

When the key management server 10 succeeds in deleting the key encryption key (A550), the key management server 10 notifies the encryption control unit 112 of the successful deletion of the key encryption key, and the encryption control unit 112 deletes the key encryption key that has been requested to be deleted from the key encryption key list 200 (S508).

When the key management server 10 fails to delete the key encryption key (A560), the key management server 10 notifies the encryption control unit 112 of the failure of the deletion of the key encryption key.

After exiting the loop of L540, it is determined whether or not a key encryption key record remains in the key encryption key list 200 (S509). When no key encryption key record remains (S509: No), the encryption control unit 112 notifies the management IF unit 111 of the successful update of the key encryption key. When there is a key encryption key record remaining (S509: Yes), the encryption control unit 112 notifies the management IF unit 111 of the failure of the update of the key encryption key and notifies the management IF unit 111 of the key encryption key 2 that has failed to be deleted (corresponding to the remaining record).

As described above, according to the present embodiment, even when the key management server 10 fails to update the key encryption key and there are duplicate key encryption keys for the same encryption key, the decryption of the encryption key can be attempted by the key encryption key with an old generation date and time using the key encryption key with a new generation date and time as a key encryption key for update, and the key encryption key can be re-updated by encrypting the encryption key with the key encryption key for update. Therefore, it is possible to keep the security of data high.

Third Embodiment

Hereinafter, a third embodiment of the invention will be described with reference to FIGS. 18 to 21.

In the second embodiment, the encryption key management system capable of updating the key encryption key for the encryption key in the storage apparatus even when the key number for the encryption key cannot be acquired has been described.

In the present embodiment, an encryption key management system that periodically checks the integrity of the key encryption key 2 stored in the key management server 10 will be described. Also in the present embodiment, the differences from the first and second embodiments will be mainly described.

In the first embodiment, the method for decrypting the encryption key 1 is based on the assumption that the correspondence between the encryption key 1 of the storage apparatus 100 and the key encryption key 2 corresponding thereto is lost. For this reason, there is a problem that the number of decryption attempts increases as the number of key encryption keys increases. In the present embodiment, in order to solve the problem, the number of key encryption keys 2 stored in the key management server 10 is periodically checked, and one key encryption key 2 corresponding to one encryption key 1 of the storage apparatus 100 is made to be present in one key management server 10 or the security administrator is urged to correct the key.

Figure 18:
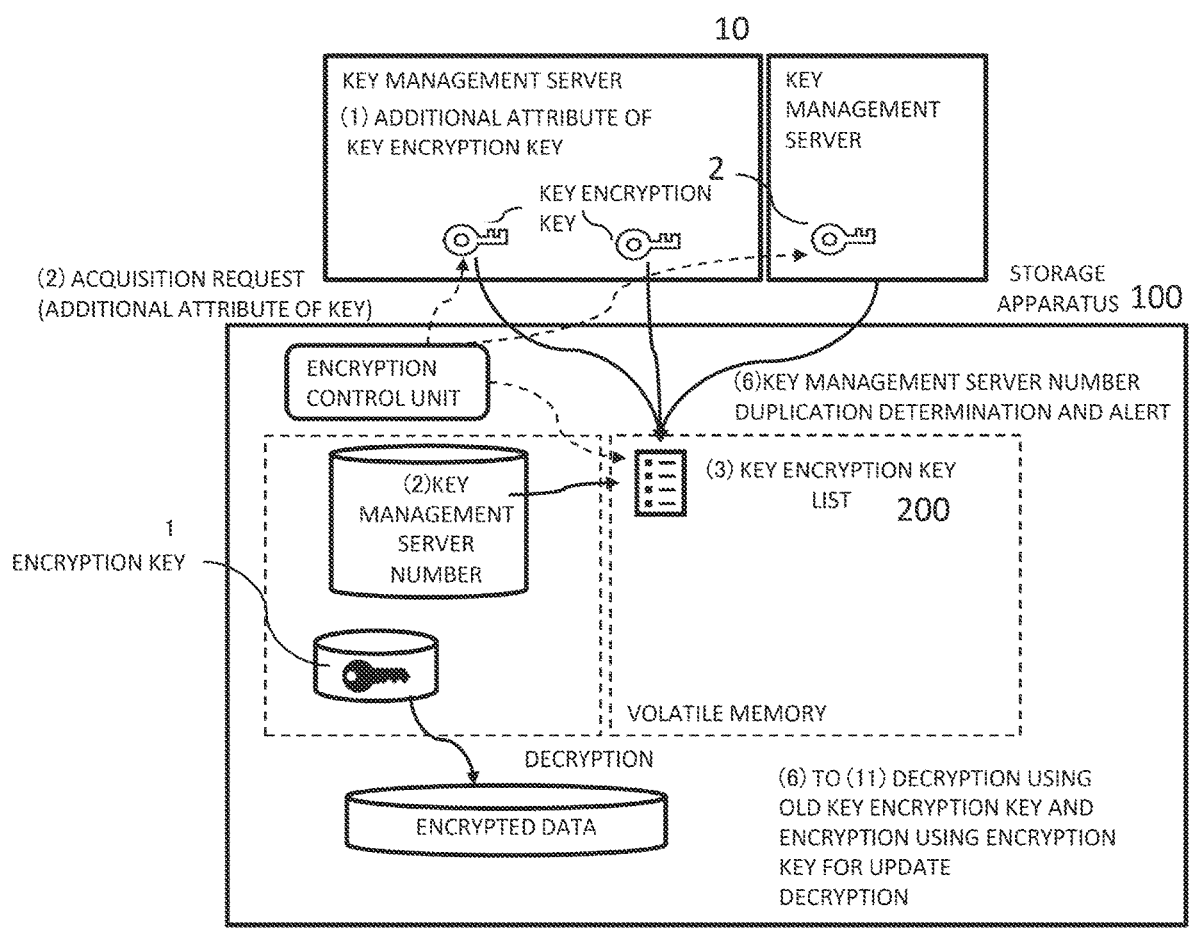
FIG. 18 is a diagram showing a series of processes for checking the integrity of a key encryption key in a key management server in a third embodiment.

Hereinafter, description will be given in the order of FIG. 18.

(1) When storing the key encryption key 2 in the key management server 10, the following attribute values are assigned from the storage apparatus 100.

Key type (key encryption key)
ID for uniquely specifying the storage apparatus (product number, model name, or the like)
Generation date and time of key encryption key Then, the storage apparatus 100 periodically executes the following (2) to (5).

(2) When acquiring the information of the key encryption key 2 from the key management server 10, the encryption control unit 112 assigns the key type (key encryption key) and the ID of the storage apparatus to the request query to make a request. Here, by the request query, requests are sent to all the key management servers 10 connected to the storage apparatus 100.

In addition, the encryption control unit 112 stores the key management server number of the key management server 10 in the storage apparatus 100, and associates the key management server number with the key encryption key when acquiring the key encryption key.

(3) The encryption control unit 112 calculates a hash value of the key encryption key 2 acquired by using the hash algorithm, associates the key encryption key 2 with the hash value in the storage apparatus, and stores these in the key encryption key list 200 as one record. In addition, the key management server number in (2) is also stored in association with the key encryption key 2.

(4) The encryption control unit 112 eliminates the duplication of the key encryption key by using the hash value. When there are duplicates, a record with a smaller key management server number is preferentially left.

(5) When there are two or more records with the same key management server number, it is considered that the update of the key encryption key 2 or the synchronization between the key management servers 10 has failed. When there are two or more key encryption keys with the same key management server number, it can be determined that the update of the key encryption key 2 has failed. In this case, any of the following controls is performed according to the setting.

When an abnormality is detected a predetermined number of times for a certain period of time, an alert is issued to the security administrator to perform processing for re-updating the key encryption key 2 or synchronization between key management servers at an arbitrary timing.

Processing for re-updating the key encryption key 2 or synchronization between key management servers is automatically performed. For the processing for re-updating the key encryption key, the key encryption key update processing in the second embodiment can be used.

As described above, since the storage apparatus 100 periodically checks the integrity of the key encryption key 2 stored in the key management server 10, it is possible to detect an abnormal update of the key encryption key 2 or a synchronization failure and repair the abnormal update or the synchronization failure automatically or manually. As a result, it is possible to prevent an increase in execution time that may occur during the decryption process of the encryption key shown in the first embodiment.

Figure 20:
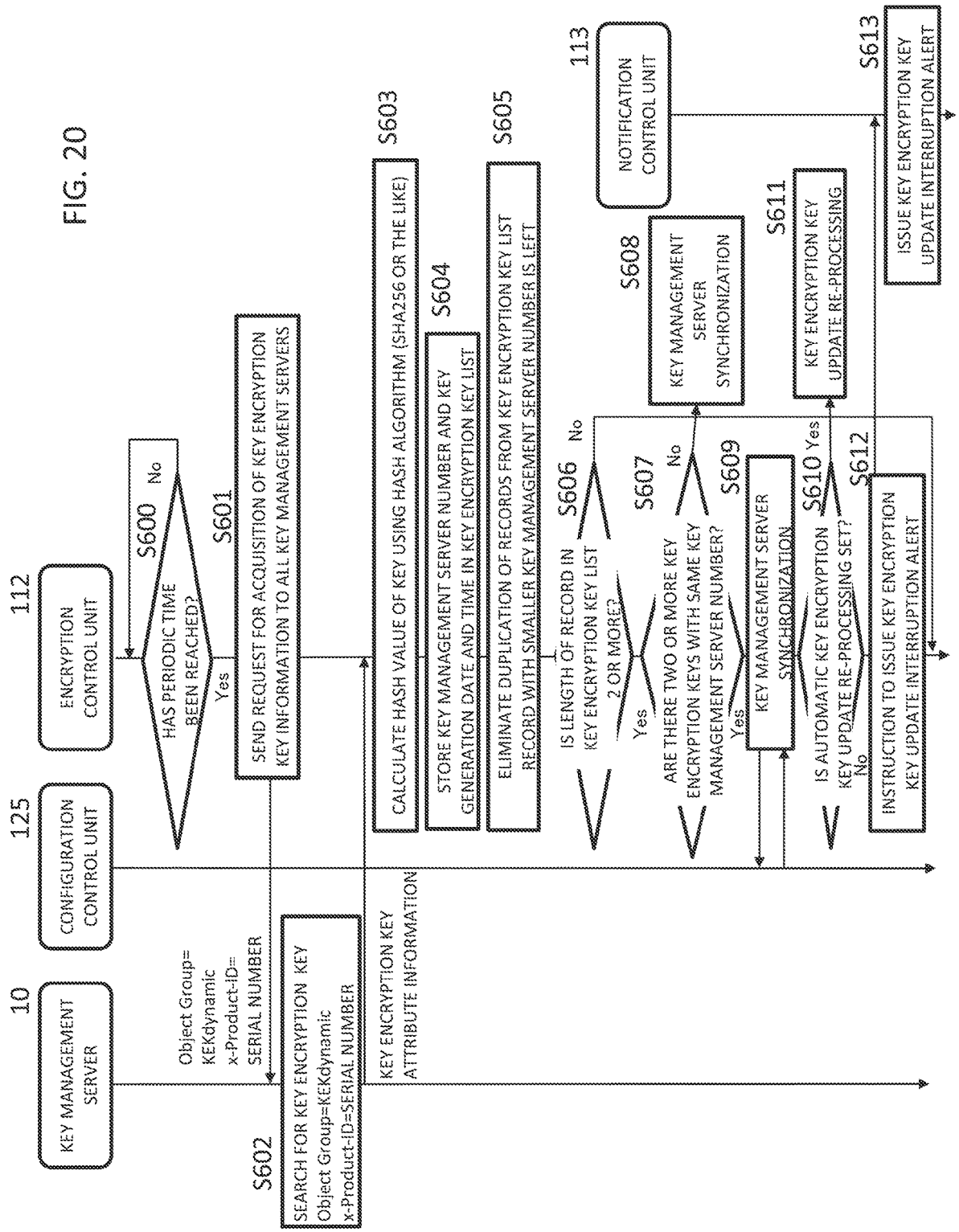
FIG. 20 is a UML sequence diagram showing the details of a periodic key encryption key update check process.
Figure 21:
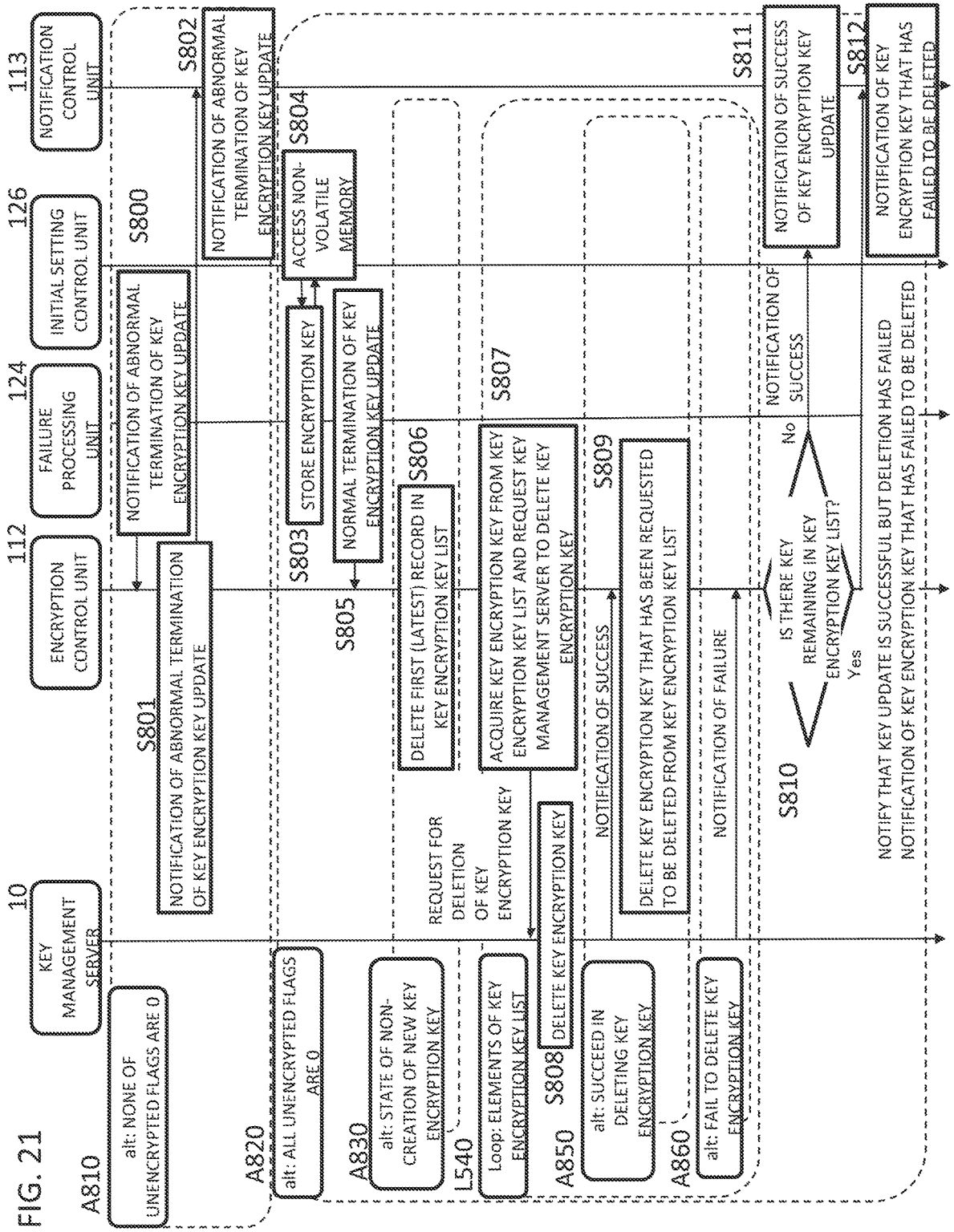
FIG. 21 is a UML sequence diagram showing the details of key encryption key update post-processing in the case of automatic update in the third embodiment.

Next, the details of the process of the encryption key management system according to the third embodiment will be described with reference to FIGS. 19 to 21.

In the present embodiment, a case will be described in which the integrity of the key encryption key stored in the key management server 10 is automatically checked and the key encryption key is automatically updated.

First, the encryption key management system performs a periodic key encryption key update interruption check process (S700). The periodic key encryption key update interruption check process is a process of periodically checking whether or not there is the integrity of the key encryption key 2 in the key management server 10, and this will be described later with reference to FIG. 20.

Then, the encryption control unit 112 sorts the key encryption key list 200 in order of the generation date and time of the key encryption key 2 (S701).

Then, the encryption control unit 112 copies the key encryption key of the first record of the key encryption key list 200 and sets the copied key encryption key as a key encryption key for update (S702).

Then, the encryption control unit 112 notifies the failure processing unit 124 of the key encryption key for update (S703).

Then, the encryption control unit 112 notifies the failure processing unit 124 of the start of the update process (S704).

Then, the storage apparatus 100 performs a key encryption key update process (S710). The key encryption key update process has already been described in detail with reference to FIG. 16.

Then, the encryption key management system performs key encryption key update post-processing in the case of automatic update (S720). The key encryption key update post-processing in the case of automatic update will be described in detail later with reference to FIG. 21.

Next, the details of the periodic key encryption key update check process will be described with reference to FIG. 20. This is a process corresponding to S700 in FIG. 19.

First, the encryption control unit 112 determines whether or not the set periodic time has been reached (S600). When the periodic time is reached, the process proceeds to S601.

The encryption control unit 112 specifies parameters (key type and storage ID), and sends a request for the acquisition of the information of the key encryption key 2 corresponding to the encryption key 1 to all of the connected key management servers 10 (S601).

Then, the key management server searches for the key encryption key based on the received parameters (S602), and transmits the attribute information of the key encryption key to the encryption control unit 112.

Then, the encryption control unit 112 calculates a hash value of the key encryption key according to a hash algorithm, such as SHA256 (S603).

Then, the encryption control unit 112 stores the received attribute information of the key encryption key 2, the hash value of the key encryption key 2, and the key encryption key number in the key encryption key list 200 shown in FIG. 11 (S604).

Then, the encryption control unit 112 eliminates the duplication of records for the key encryption key 2 having the same hash value (S605). At this time, a record with a smaller key management server number is preferentially left.

Then, the encryption control unit 112 determines whether or not the length of the record IN the key encryption key list 200 is 2 or more (S606). When the length of the record in the key encryption key list 200 is less than 2 (S606: No), the process ends. When the length of the record in the key encryption key list 200 is 2 or more, the process proceeds to S607.

When the length of the record in the key encryption key list 200 is 2 or more, the encryption control unit 112 determines whether or not there are two or more records with the same key management server number in the key encryption key list 200 (S607), and makes a request for synchronization between the key management servers 10 (S608).

Then, the encryption control unit 112 refers to the configuration of the storage apparatus 100 from the configuration control unit 125 (S609), and determines whether or not the automatic key encryption key update re-processing is set (S610). When the automatic key encryption key update re-processing is set (S610: Yes), the storage apparatus 100 performs key encryption key update re-processing (S611). The key encryption key update re-processing is the same as the key encryption key update process shown in FIG. 16.

When the automatic key encryption key update re-processing is not set, the encryption control unit 112 instructs the notification control unit 113 to issue a key encryption key update alert (S612), and the notification control unit 113 issues a key encryption key update alert (S613).

Then, the details of the key encryption key update post-processing in the case of automatic update will be described with reference to FIG. 21.

Figure 19:
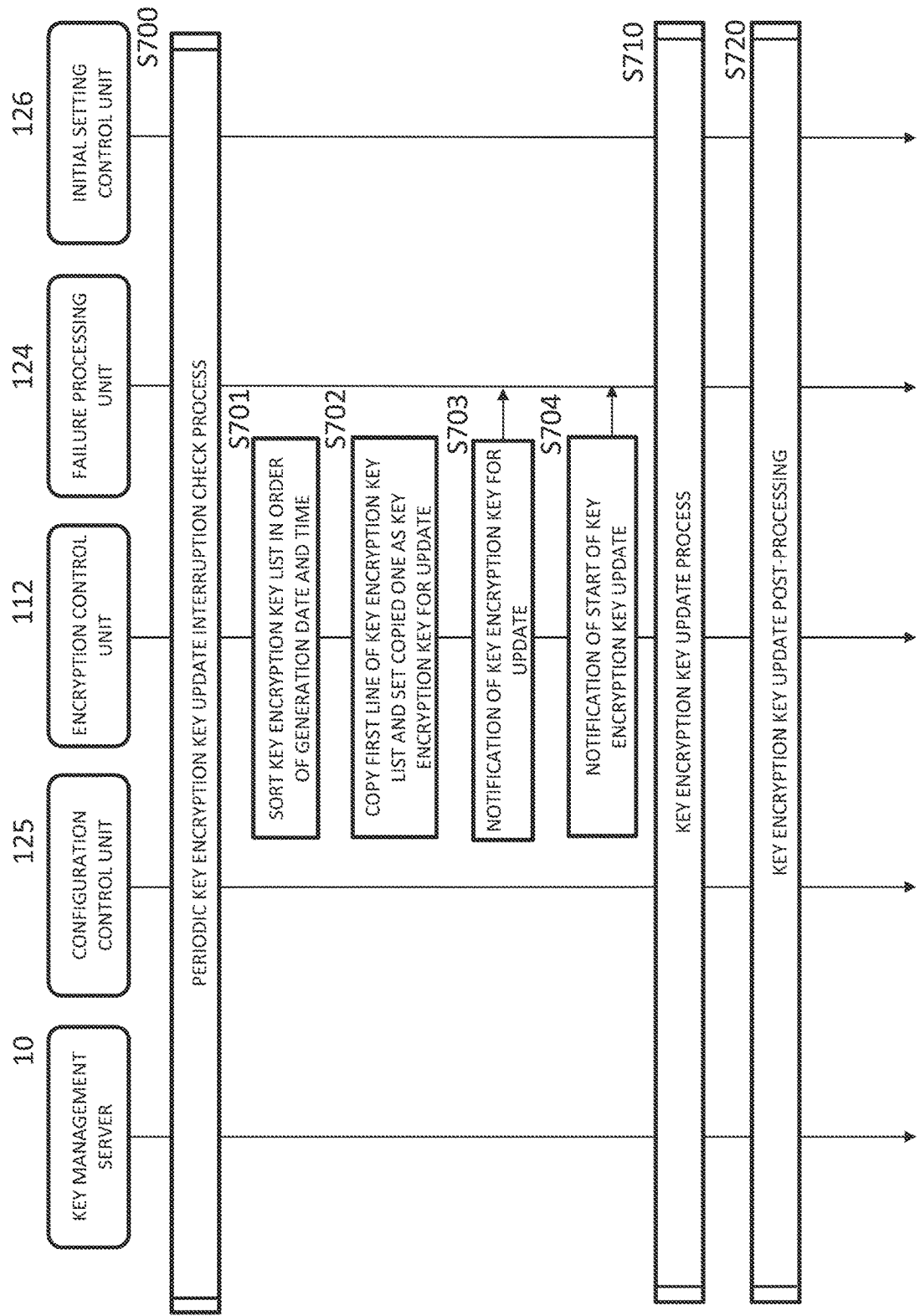
FIG. 19 is a UML sequence diagram showing the details of a process of an encryption key management system in the case of automatic update in the third embodiment.

This is a process corresponding to S720 in FIG. 19.

In the key encryption key update post-processing in the case of manual update, when none of the unencrypted flags are 0 (encrypted) (A810), the failure processing unit 124 notifies the encryption control unit 112 of the abnormal termination of the key encryption key update (S800), and the encryption control unit 112 notifies the management IF unit 111 of the abnormal termination of the key encryption key update (S801).

In response to this, the management IF unit 111 notifies the abnormal termination of the key encryption key update (S802).

When all the unencrypted flags are 0 (encrypted) (A820), the failure processing unit 124 transmits the encrypted encryption key to the initial setting control unit 126, and the initial setting control unit 126 accesses the non-volatile memory 133 (S804) to store the encrypted encryption key (S803), and notifies the encryption control unit 112 that the key encryption key update has normally ended (S805).

Then, when the state of the encryption control unit 112 is non-creation of a new key encryption key for update (S310) (A830), the first record (corresponding to the key encryption key used for the key encryption key for update) in the key encryption key list 200 is deleted (S806). This means that the key management server is not requested to delete the key encryption key used for the key encryption key for update by the following S807.

Then, the encryption control unit 112 performs loop processing of S807 to S809 for each record of the key encryption key list 200 (L850).

The encryption control unit 112 extracts a key encryption key and a key management server number from the key encryption key list 200, and sends a deletion request to the key management server 10 (S807).

The key management server 10 deletes the key encryption key in response to the request (S808).

When the key management server 10 succeeds in deleting the key encryption key (A850), the key management server 10 notifies the encryption control unit 112 of the successful deletion of the key encryption key, and the encryption control unit 112 deletes the key encryption key that has been requested to be deleted from the key encryption key list 200 (S809).

When the key management server 10 fails to delete the key encryption key (A860), the key management server 10 notifies the encryption control unit 112 of the failure of the deletion of the key encryption key.

After exiting the loop of L850, it is determined whether or not a key encryption key record remains in the key encryption key list 200 (S810). When no key encryption key record remains (S810: No), the encryption control unit 112 notifies the management IF unit 111 of the successful update of the key encryption key. When there is a key encryption key record remaining (S810: Yes), the encryption control unit 112 notifies the management IF unit 111 of the failure of the update of the key encryption key and notifies the management IF unit 111 of the key encryption key 2 that has failed to be deleted (corresponding to the remaining record).

When the management IF unit 111 is notified that the update of the key encryption key is successful, the management IF unit 111 notifies the security administrator of the success of the key encryption key update (S811). When the management IF unit 111 is notified that the update of the key encryption key has failed, the management IF unit 111 notifies of the key encryption key 2 that has failed to be deleted (corresponding to the remaining record) (S812).

As described above, in the present embodiment, since the integrity of the key encryption key in the key management server is periodically checked, the integrity of the key encryption key in the key management server is maintained. Therefore, there is an advantage that the decryption of the encryption key in the extra storage apparatus 100 is not performed.

What is claimed is:

1. An encryption key management system, comprising:
   a storage apparatus that encrypts data with one or more encryption keys and stores the encrypted data; and
   one or more key management servers connected to the storage apparatus through a network,
   wherein each of the key management servers holds one or more key encryption keys for encrypting the encryption keys together with its attribute information,
   the storage apparatus holds the encryption keys encrypted by the key encryption keys,
   the storage apparatus sends a request for the key encryption key corresponding to the storage apparatus to the key management server using a storage apparatus ID for uniquely identifying the storage apparatus as a parameter,
   the storage apparatus acquires the key encryption key corresponding to the storage apparatus and its attribute information from the key management server,
   the storage apparatus stores the acquired key encryption key and its attribute information in a key encryption key list while eliminating the key encryption key that is duplicated, and
   the storage apparatus attempts to decrypt the encryption key using the key encryption key stored in the key encryption key list, determines a success or failure of the decryption of the encryption key, and attempts to decrypt the encryption key using the key encryption key stored in the key encryption key list, which has not been attempted yet, when the decryption of the encryption key using the key encryption key fails.

2. The encryption key management system according to claim 1,
   wherein the attribute information includes a generation date and time of the key encryption key, and
   in the key encryption key list, the key encryption keys are arranged in order of a new generation date and time.

3. The encryption key management system according to claim 1,
   wherein the storage apparatus generates a hash value from data indicating the key encryption key acquired from the key management server, and stores the hash value in the key encryption key list in association with the acquired key encryption key, and
   the hash value is used to determine whether or not a duplicate key encryption key is stored in the key encryption key list.

4. The encryption key management system according to claim 1,
   wherein the key encryption key list and the decrypted encryption key are held in a volatile memory of the storage apparatus.

5. An encryption key management system, comprising:
   a storage apparatus that encrypts data with one or more encryption keys and stores the encrypted data; and one or more key management servers connected to the storage apparatus through a network, wherein each of the key management servers holds one or more key encryption keys for encrypting the encryption keys together with its attribute information, the storage apparatus holds the encryption keys encrypted by the key encryption keys, the storage apparatus sends a request for the key encryption key corresponding to the storage apparatus to the key management server using a storage apparatus ID for uniquely identifying the storage apparatus as a parameter, the storage apparatus acquires the key encryption key corresponding to the storage apparatus and its attribute information from the key management server, the storage apparatus stores the key encryption key and its attribute information in a key encryption key list while eliminating the key encryption key that is duplicated, the attribute information includes a generation date and time of the key encryption key, in the key encryption key list, the key encryption keys are arranged in order of a new generation date and time, the storage apparatus stores a key management server number that specifies a key encryption key to acquire the key encryption key corresponding to the storage apparatus, when there is the same key management server number, the storage apparatus sets a key encryption key having a new generation date and time as a key encryption key for update and sets a key encryption key having a next generation date and time as an old key encryption key in order of a generation date and time and attempts decryption using the old key encryption key, when there is no same key management server number, the storage apparatus sets the key encryption key stored in the key encryption key list as an old key encryption key, requests the key management server to generate a new key encryption key for update, and acquires the key encryption key for update, the storage apparatus determines a success or failure of the decryption using the old key encryption key, and encrypts the decrypted encryption key with the key encryption key for update when the decryption using the old key encryption key is successful, when there is the same key management server number, the storage apparatus requests the key management server to delete key encryption keys other than the key encryption key for update, and when there is no same key management server number, the storage apparatus requests the key management server to delete key encryption keys stored in the key encryption key list.

6. The encryption key management system according to claim 5, wherein the storage apparatus periodically acquires the key encryption key, for which a request has been sent to the key management server, and its attribute information, and the storage apparatus determines whether or not there is the same key management server number in the key encryption key list, and generates an alert or requests the key management server to perform key encryption key re-update or key encryption key synchronization when there is the same key management server number in the key encryption key list.

7. An encryption key management method using an encryption key management system in which a storage apparatus that encrypts data with one or more encryption keys and stores the encrypted data is connected to one or more key management servers through a network, the method comprising:

a step in which each of the key management servers holds one or more key encryption keys for encrypting the encryption keys together with its attribute information;

a step in which the storage apparatus sends a request for the key encryption key to the key management server using a storage apparatus ID for uniquely identifying the storage apparatus as a parameter;

a step in which the storage apparatus holds the encryption keys encrypted by the key encryption keys;

a step in which the storage apparatus sends a request for the key encryption key corresponding to the storage apparatus to the key management server using a storage apparatus ID for uniquely identifying the storage apparatus as a parameter;

a step in which the storage apparatus acquires the key encryption key, for which a request has been sent to the key management server, and its attribute information;

a step in which the storage apparatus stores the key encryption key and its attribute information in a key encryption key list while eliminating the key encryption key that is duplicated;

a step in which the storage apparatus attempts to decrypt the encryption key using the key encryption key stored in the key encryption key list; and a step in which the storage apparatus determines a success or failure of the decryption of the encryption key and attempts to decrypt the encryption key using the key encryption key stored in the key encryption key list, which has not been attempted yet, when the decryption of the encryption key using the key encryption key fails.

* * * * *